(12) United States Patent
Yamaguchi et al.

(10) Patent No.: US 7,597,407 B2
(45) Date of Patent: Oct. 6, 2009

(54) MOTOR-DRIVEN BRAKE SYSTEM

(75) Inventors: Tohma Yamaguchi, Kawasaki (JP);
Yukio Ohtani, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 651 days.

(21) Appl. No.: 11/336,781

(22) Filed: Jan. 23, 2006

(65) Prior Publication Data
US 2006/0170282 A1    Aug. 3, 2006

(30) Foreign Application Priority Data
Jan. 28, 2005    (JP)    ............................. 2005-021871

(51) Int. Cl.
*B60T 13/00*    (2006.01)
(52) U.S. Cl. ........................ 303/20; 188/156; 188/162
(58) Field of Classification Search .................. 303/20, 303/89; 188/156, 158, 162, 163, 72.1, 71.9; 310/12, 13, 14
See application file for complete search history.

(56) References Cited
U.S. PATENT DOCUMENTS
6,139,117 A * 10/2000 Shirai et al. ..................... 303/3

| | | | |
|---|---|---|---|
| 6,571,921 B2 * | 6/2003 | Ohtani et al. | 188/72.1 |
| 6,915,883 B2 * | 7/2005 | Watanabe et al. | 188/156 |
| 7,299,905 B2 * | 11/2007 | Yamaguchi et al. | 188/156 |
| 2002/0023806 A1 * | 2/2002 | Ohtani et al. | 188/72.1 |
| 2005/0258683 A1 * | 11/2005 | Yamaguchi | 303/89 |

FOREIGN PATENT DOCUMENTS
JP    2002-225701    8/2002
JP    2003-42199    2/2003

* cited by examiner

*Primary Examiner*—Pam Rodriguez
(74) *Attorney, Agent, or Firm*—Wenderoth, Lind & Ponack, L.L.P.

(57) ABSTRACT

A motor-driven brake system includes a brake body for enabling brake pads to be pressed against a disk rotor attached to a member which supports a wheel of a vehicle, the brake pads being adapted to be driven by an electric device; a pressing-force maintaining mechanism for maintaining the pressing force generated by the brake body; a pressing-force detecting device adapted to detect the pressing force generated by the brake body; and a control device for controlling the electric device and the pressing-force maintaining mechanism, the control device including an elapsed time measuring device adapted to measure elapsed time during a parking brake operation; and a pressing-force reduction predicting device adapted to predict, based on the elapsed time measured by the elapsed time measuring device and a value of a pressing force, a magnitude of the pressing force generated by the brake body after the elapsed time.

16 Claims, 13 Drawing Sheets

| PRESSING FORCE REDUCTION FACTOR At | At < dF1 | At = dF1 | At > dF1 |
|---|---|---|---|
| PKB RE-OPERATION DETERMINATION | OFF-DEMAND | ONE TIME | CON-TINUATION |

MOTOR-DRIVEN BRAKE SYSTEM

BACKGROUND OF THE INVENTION

The present invention relates to a motor-driven brake system for generating a braking force by means of a torque of a motor. More specifically, the present invention relates to a motor-driven brake system provided with a parking brake function.

A motor-driven brake system of this type comprises a brake body including a caliper having provided therein a piston, a motor and a rotary-linear motion conversion mechanism for enabling rotation of the motor to be converted to a linear motion and transmitted to the piston. Thrust is imparted to the piston according to a rotation of a rotor of the motor, to thereby press a brake pad against a disk rotor, thus braking a wheel under a pressing force (generated braking force). Normally, in such a motor-driven brake system, a force applied by a driver to a brake pedal, or a stroke of the brake pedal, is detected by a sensor, and rotation (an angle of rotation) of the motor is controlled based on a value detected by the sensor, to thereby obtain a desired braking force.

Recently, various attempts have been made to increase the advantage provided by such a motor-driven brake system by providing the system with a parking brake function.

A motor-driven disk brake is reversible relative to a reactive force imposed by brake pads. Therefore, to apply a parking brake using such a motor-driven disk brake, it is necessary to provide a means to fix a piston.

For example, in a motor-driven caliper in which a rotary motion of the motor is converted to a linear motion, a rotor of the motor is adapted to be locked (a pressing force is maintained) by means of a solenoid actuator (hereinafter referred to simply as "solenoid"). To use the caliper for a parking brake, the rotor of the motor should be locked while maintaining the solenoid in a non-energized condition. To this end, use is made of (1) a mechanism for unlocking the rotor under normal braking by placing the solenoid in an energized condition, and for locking the rotor during use of the parking brake by placing the solenoid in a non-energized condition; or (2) a mechanism using a solenoid having a latch mechanism, in which the solenoid is temporarily energized in a direction for unlocking for normal braking, and is temporarily energized in a direction for locking for applying the parking brake (a mechanism for maintaining a pressing force).

An example of a motor-driven brake system of the above-mentioned type having a parking brake function is disclosed in Japanese Patent Application Public Disclosure No. 2003-42199.

The motor-driven brake system of Japanese Patent Application Public Disclosure No. 2003-42199 comprises a brake body including a caliper having provided therein a piston, a motor and a rotary-linear motion conversion mechanism for enabling rotation of the motor to be converted to a linear motion and transmitted to the piston. Thrust is imparted to the piston according to a rotation of a rotor of the motor, to thereby press a brake pad against a disk rotor, thus generating a braking force. The motor-driven brake system further comprises a parking brake lock mechanism (a pressing force maintaining mechanism). The parking brake lock mechanism comprises a ratchet wheel which is provided in the rotor of the motor. The parking brake lock mechanism comprises a plurality of substantially projecting tooth portions arranged continuously in a circumferential direction on an outer circumferential surface of the ratchet wheel. The parking brake lock mechanism further comprises an engaging pawl provided at a periphery of the ratchet wheel and adapted to move so as to be capable of being engaged with, or disengaged from, the ratchet wheel. The parking brake lock mechanism further comprises a solenoid (an actuator) for moving the engaging pawl, and applies the parking brake by engaging the engaging pawl with the ratchet wheel.

To apply the parking brake, the rotor of the motor is rotated in one direction to thereby generate a braking force. The solenoid is excited simultaneously with generation of the braking force, to thereby move the engaging pawl towards the ratchet wheel for engagement. Due to this engagement between the engaging pawl and the ratchet wheel, rotation of the rotor in the direction for releasing the brake is restricted, thus exerting a parking brake function.

If the parking brake is actuated when the brake pads are at a high temperature, the pressing force of the brake pads changes with time during application of the parking brake, as a result of contraction of the brake pads as their temperature lowers. FIG. 10 shows how the pressing force of the brake pads changes during application of the parking brake. As indicated by a curved line A in FIG. 10, the pressing force is gradually reduced with time below the pressing force that is required for performing a parking brake function (hereinafter frequently referred to simply as "the required pressing force"). In the motor-driven brake system, a desired pressing force can be generated. Therefore, to obviate the above-mentioned problem, a pressing force generated at a time when the parking brake is actuated (for convenience sake, hereinafter frequently referred to as "the pressing force when the parking brake is actuated") can be set to be large, allowing for a lowering of the pressing force due to a lowering of temperature of the brake pads. However, to generate a large pressing force at a time the parking brake is actuated, the caliper must be increased in size, so as to ensure its durability.

To avoid such an increase in size of the caliper, it has been proposed to use a motor-driven brake system in which, as indicated by a curved line B in FIG. 10, the parking brake is first operated to thereby generate a pressing force that is slightly higher than the required pressing force, and thereafter the parking brake is re-operated a predetermined number of times at predetermined time intervals or, while monitoring a lowering of the pressing force using a pressing force detecting means, re-operation of the parking brake (involving continuous checking of the pressing force by means of the pressing force detecting means, driving of the motor and driving of the solenoid of the parking brake lock mechanism) is conducted each time the pressing force reaches the required pressing force (see Japanese Patent Public Disclosure No. 2002-225701).

However, in the former system (the motor-driven brake system in which the parking brake is re-operated at predetermined time intervals), it is required to actuate the parking brake a predetermined number of times at predetermined time intervals even after the engine is stopped. In this case, when the parking brake is actuated many times, the power supply of the motor-driven brake system cannot be turned off for a long time period, which leads to a high consumption of power. On the contrary, if the number of times the parking brake is actuated is reduced, a lowering of the pressing force due to a lowering of temperature of the brake pads is likely to occur. Therefore, this motor-driven brake system is still unsatisfactory.

Further, in the latter system (re-operation of the parking brake is conducted each time the pressing force reaches the required pressing force), it is required to continuously check whether a pressing force reaches the required pressing force, by means of the pressing force detecting means. Therefore, power is consumed over a long time period. Therefore, as in the case of the former system, this motor-driven brake system is also still unsatisfactory.

SUMMARY OF THE INVENTION

In view of the above situation, the present invention has been made. It is an object of the present invention to provide a motor-driven brake system which is capable of avoiding excessive consumption of power.

As described above, after the parking brake is applied by operating the pressing force maintaining mechanism, the pressing force of the brake pads relative to the disk rotor is gradually reduced due to contraction of the brake pads, which occurs with time and a consequent lowering in their temperature. According to the present invention, it is possible to predict whether a pressing force will decrease to the required pressing force, based on an elapsed time measured by elapsed time measuring means and a value of the pressing force detected by pressing force detecting means when the elapsed time is measured, before the pressing force actually reaches the pressing force level required for maintaining a parking brake function. Therefore, a supply of power to each member after operation of the pressing force maintaining mechanism can be stopped earlier, to thereby reduce consumption of power.

DETAILED DESCRIPTION OF THE INVENTION

Hereinbelow, an embodiment of the present invention will be described in detail, referring to the accompanying drawings.

Figure 4:
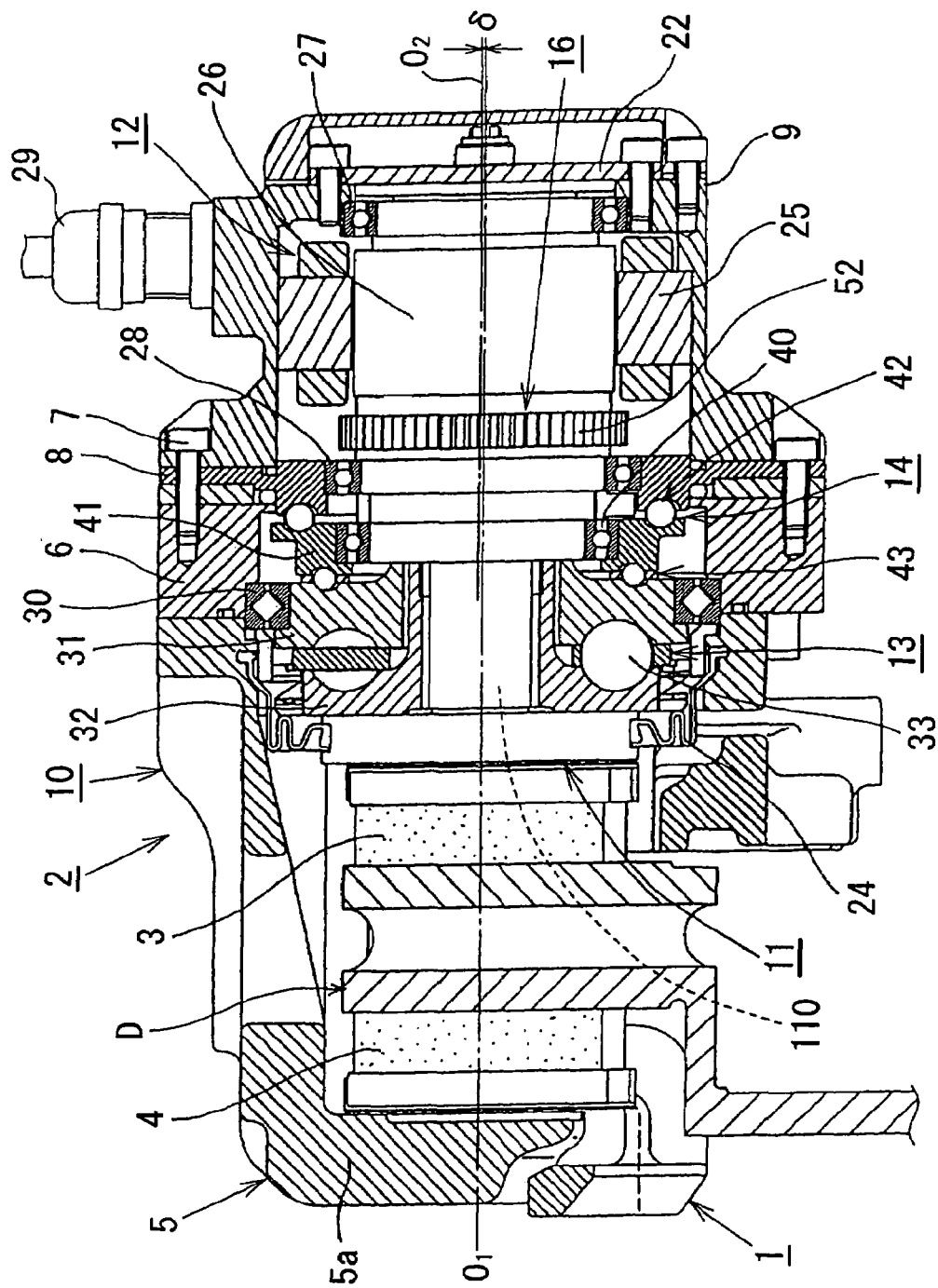
FIG. 4 is a cross-sectional view of an entire construction of the motor-driven brake system.
Figure 5:
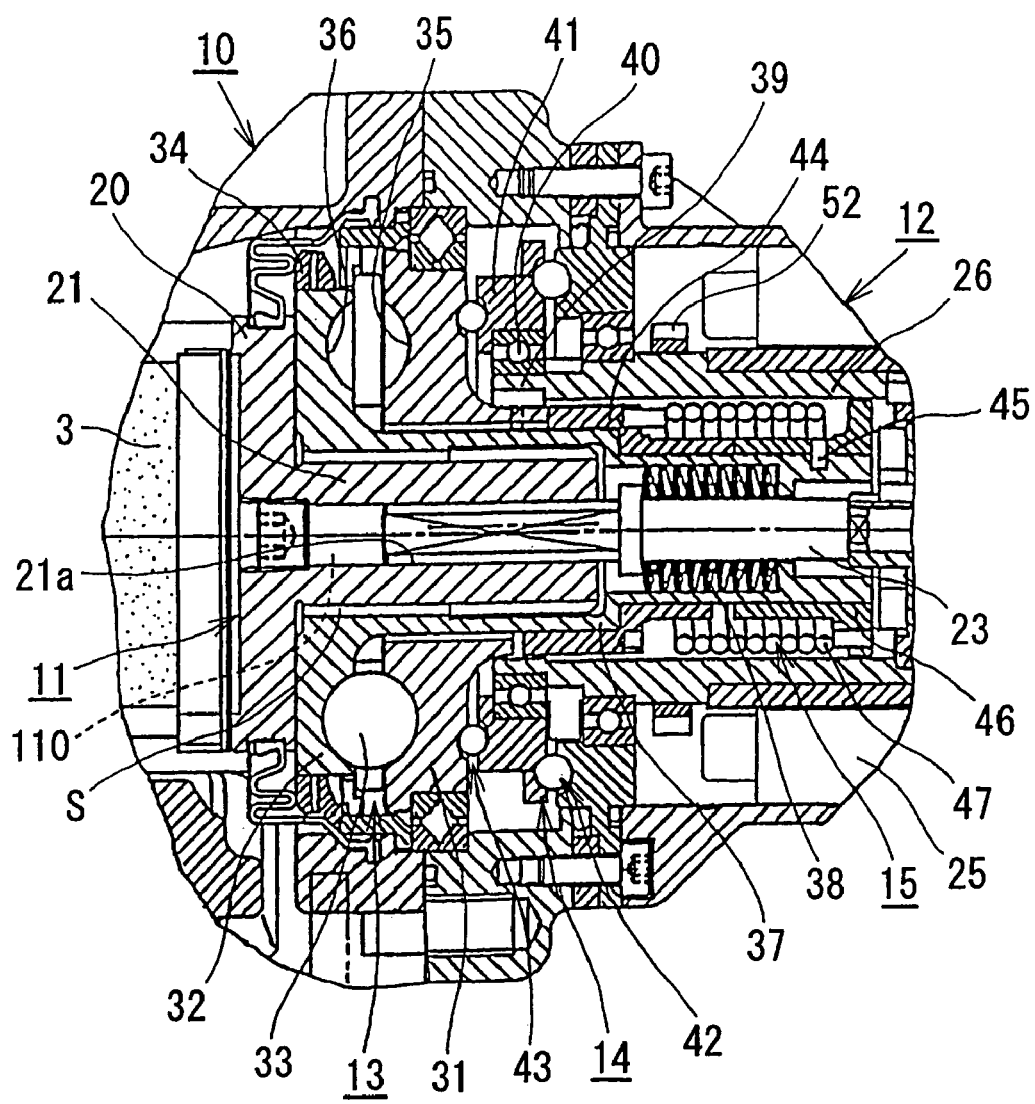
FIG. 5 is an enlarged cross-sectional view of a part of the motor-driven brake system.

FIGS. 4 and 5 show an entire construction of a motor-driven brake system according to an embodiment of the present invention. In these drawings, reference 1 denotes a carrier fixed to a non-rotatable portion (such as a knuckle) of a vehicle body located on an inner side of the vehicle body relative to a disk rotor D. Reference numeral 2 denotes a caliper supported by the carrier 1 so as to be capable of performing a floating motion in an axial direction of the disk rotor D. Reference numerals 3 and 4 denote a pair of brake pads disposed on opposite sides of the disk rotor D. The brake pads 3 and 4 are supported by the carrier 1 so as to be capable of moving in the axial direction of the disk rotor D. The caliper 2 comprises a caliper body 10 in the form of an assembly. The caliper body 10 comprises a claw member 5 including a claw portion 5a, an annular base body 6 connected to a proximal end of the claw member 5 by means of a bolt (not shown), a ring-shaped support plate 8 and a motor case 9 which are connected to the annular base body 6 by means of bolts 7. The claw portion 5a of the claw member 5 is disposed in proximity to a rear surface of the brake pad 4 on an outer side of the vehicle body. The carrier 1 and the caliper 2 in combination provide a brake body (a reference numeral therefor is omitted).

In the caliper 2, there are provided a piston 11 capable of abutting against a rear surface of the brake pad 3 on an inner side of the vehicle body, a motor 12 (an electric device), a ball ramp mechanism (a rotary-linear motion conversion mechanism) 13 for enabling rotation of the motor 12 to be converted to a linear motion and transmitted to the piston 11, a differential reduction mechanism 14 for transmitting rotation of the motor 12 to the ball ramp mechanism 13 with a predetermined reduction ratio, a pad wear compensation mechanism 15 for compensating for an amount of wear of the brake pads 3 and 4 by changing a position of the piston 11 in relation to the amount of wear, and a parking brake lock mechanism (a pressing force maintaining mechanism) 16 (FIGS. 1 and 2) for securing a parking brake. The parking brake lock mechanism 16 is described later in detail.

The piston 11 comprises a large-diameter body portion 20 and a small-diameter shaft portion 21. The large-diameter body portion 20 is disposed in proximity to the brake pad 3 on an inner side of the vehicle body. The small-diameter shaft portion 21 of the piston 11 includes an axial bore 21a having a rectangular cross-section. A forward end portion of a support rod 23 extending from an end plate 22 of the motor case 9 is inserted into the axial bore 21a, thus supporting the piston 11 by means of the support rod 23 in a manner such as to allow a sliding motion of the piston 11 while preventing a rotary motion of the piston 11. A cover 24 made of rubber is provided so as to extend between the large-diameter body portion 20 of the piston 11 and the caliper body 10 so as to close an inside of the caliper body 10 relative to the outside.

The motor 12 comprises a brushless motor including a stator 25 fixed in a fitted relationship to the motor case 9, and a rotor 26 having a hollow structure and which is disposed within the stator 25. As the motor, a motor other than a brushless motor, such as an ultrasonic motor, may be used. The rotor 26 is rotatably supported by means of the motor case 9 and the ring-shaped support plate 8 through bearings 27 and 28. The motor 12 is operated so as to rotate the rotor 26 through a desired angle with a desired torque, in response to a command signal from a controller (a control device, pressing force reduction predicting means, parking brake re-operation controlling means, parking brake operation completing means) 100. The angle of rotation (an angular position) of the rotor 26 is detected by means of an angular position sensor 101 shown in FIG. 6, which is disposed inside the rotor 26. The angular position of the motor 12 and a thrusting force have a predetermined relationship. This relationship is preliminarily measured and the result is stored in the controller 100. The thrusting force can be determined, based on data detected by the angular position sensor 101.

A connector 29 is attached to the caliper body 10 to take a signal line for connecting the stator 25 and the angular position sensor 101 to the controller 100.

The ball ramp mechanism 13 comprises: a ring-shaped first disk (a rotatable member) 31, rotatably supported by an inner circumferential surface of the annular base body 6 of the caliper body 10 through a cross roller bearing 30; a ring-shaped second disk (a linearly movable member) 32 connected to the small-diameter shaft portion 21 of the piston 11 through a screw portion S; and balls 33 interposed between the first disk 31 and the second disk 32. The second disk 32 is disposed in an abutting relationship to a rear surface of the large-diameter body portion 20 of the piston 11. Normally, rotation of the second disk 32 is restricted under a frictional force exerted by a wave washer 34 disposed between the second disk 32 and the caliper body 10.

The balls 33 are provided between arcuate ball grooves 35 and 36 formed in the respective surfaces of the first and second disks 31 and 32 facing each other. Each of these surfaces of the first disk 31 and the second disk 32 include three ball grooves 35 or 36. The ball grooves 35 and 36 extend in a circumferential direction of the disks 31 and 32, and are inclined in the same direction while being equally spaced from each other in a range of the same central angle (e.g., 90 degrees). When the first disk 31 rotates in a counterclockwise direction as viewed from the right side in FIGS. 4 and 5, the second disk 32 receives a pressing force acting in a leftward direction in FIGS. 4 and 5. In this instance, since the second disk 32 is prevented from rotating by means of the wave washer 34, the second disk 32 performs a linear motion (advances) without being rotated. The piston 11 advances (thrusts) accordingly, and presses the brake pad 3 on an inner side of the vehicle body against the disk rotor D.

On the other hand, the second disk 32 includes an extended cylindrical portion 37 in a portion (the screw portion S) threadably engaged with the small-diameter shaft portion 21 of the piston 11. The extended cylindrical portion 37 extends a substantial length towards the end plate 22 of the motor case 9. A Belleville spring 38 is disposed in the extended cylindrical portion 37. The Belleville spring 38 has one end thereof engaged with the support rod 23, and normally biases the second disk 32 towards the first disk 31 through the extended cylindrical portion 37. Consequently, the balls 33 of the ball ramp mechanism 13 are maintained under high pressure between the two disks 31 and 32 and, when the first disk 31 rotates in a clockwise direction as viewed from the right side in FIGS. 4 and 5, the second disk 32 retracts in a rightward direction in FIGS. 4 and 5, to thereby separate the piston 11 from the brake pad 3.

As is clearly shown in FIG. 5, the differential reduction mechanism 14 comprises an eccentric shaft 39 formed on one end of the rotor 26 of the motor 12 extended towards the disk rotor D. The differential reduction mechanism 14 further comprises: an eccentric plate 41 fittingly mounted on the eccentric shaft 39 in a rotatable manner through a bearing 40; an Oldham mechanism 42 interposed between the eccentric plate 41 and the ring-shaped support plate 8 of the caliper body 10; and a cycloid ball reduction mechanism 43 interposed between the eccentric plate 41 and the first disk 31 of the ball ramp mechanism 13. Due to the action of the Oldham mechanism 42, the eccentric plate 41 performs an orbital motion, without being rotated on its axis, in accordance with a rotation of the eccentric shaft 39. On the other hand, the cycloid ball reduction mechanism 43 is operated in accordance with the orbital motion of the eccentric plate 41, to thereby rotate the first disk 31 in a direction opposite to the direction of rotation of the rotor 26, with a predetermined rotation ratio relative to the rotor 26. In FIG. 4, $O_1$ and $O_2$ denote the center of rotation of the rotor 26 and the center of rotation of the eccentric shaft 39, respectively. $\delta$ denotes an amount of offset between $O_1$ and $O_2$.

It should be noted that in the cycloid ball reduction mechanism 43, a rotation ratio N of the first disk 31 to the rotor 26 is represented by $N=(D \cdot d)/D$ wherein d indicates the diameter of a reference circle of a cycloid groove on a side of the eccentric plate 41 and D indicates the diameter of a reference circle of a cycloid groove on a side of the first disk 31. In this case, the number of rotations of the rotor 26 for one rotation of the first disk 31 is a reduction ratio $\alpha$ ($=1/N$). When the rotor 26 rotates through a certain angle $\theta$, an angle $\theta_A$ of rotation of the first disk 31 is $\theta/\alpha$, and the second disk 32 advances by $S=(L/360) \times (\theta/\alpha)$ wherein L represents the inclination (lead) of the ball grooves 35 and 36 of the ball ramp mechanism 13.

As is clearly shown in FIG. 5, the pad wear compensation mechanism 15 comprises: a limiter 44 rotatably fitted around the extended cylindrical portion 37 of the second disk 32 of the ball ramp mechanism 13 and operatively connected to the first disk 31 with play in a direction of rotation; a spring holder 46 fitted around the extended cylindrical portion 37 of the second disk 32 and fixedly positioned relative to the second disk 32 by means of a pin 45; and a coil spring 47 disposed around the spring holder 46 and having one end thereof connected to the limiter 44 and the other end connected to the spring holder 46.

In the pad wear compensation mechanism 15, when wear occurs in the brake pads 3 and 4, the limiter 44 rotates according to the rotation of the first disk 31 of the ball ramp mechanism 13, and the rotation of the limiter 44 is transmitted to the second disk 32 through the coil spring 47, the spring holder 46 and the pin 45. The piston 11, which is prevented from rotating by means of the support rod 23, advances along the support rod 23 until the brake pad 3 is pressed against the disk rotor D, i.e., until a braking force is generated, thus compensating for a gap corresponding to an amount of pad wear. On the other hand, after the braking force has been generated, the rotation of the second disk 32 is restricted due to large frictional resistance generated in the screw portion S between the piston 11 and the second disk 32. Therefore, rotational misalignment between the second disk 32 and the first disk 31, that is, rotational misalignment between the spring holder 46 and the limiter 44, is absorbed by twisting of the coil spring 47.

As is clearly shown in FIGS. 1 and 2, the parking brake lock mechanism 16 generally comprises a lock mechanism 50 capable of locking and unlocking the rotor 26 of the motor 12 with respect to rotation in a direction L for releasing the brake, and also comprises a PKBSOL (PKB solenoid) [hereinafter, frequently referred to simply as "the solenoid"] 51 for effecting a locking/unlocking action of the lock mechanism 50.

The lock mechanism 50 comprises a ratchet wheel 52 which is integral with an outer circumferential surface of the rotor 26. The lock mechanism 50 further comprises: a pivot arm 54 provided at a periphery of the ratchet wheel 52, and having a basal end thereof pivotably connected to the caliper body 10 by means of a pin 53; an engaging pawl 56 having a basal end thereof pivotably connected to a longitudinally intermediate portion of the pivot arm 54 using a pin 55; a stopper portion 57 provided in the caliper body 10 and adapted to abut against a side surface of the pivot arm 54 to thereby erect the pivot arm 54 in a tangential direction of the rotor 26; a torsion spring (biasing means) 58 for providing a biasing force acting on the engaging pawl 56 in a counterclockwise direction in FIG. 1; and a projection 59 which cooperates with the torsion spring 58 to hold the engaging pawl 56 in an erected position that enables engagement between the engaging pawl 56 and the ratchet wheel 52. Each tooth portion 60 of the ratchet wheel 52 is configured such that a tooth face 60a faces forward with respect to the direction L of rotation of the rotor 26 for releasing the brake (a counterclockwise direction as viewed from the right side in FIGS. 4 and 5), and an inclined relieved surface 60b faces forward with respect to the direction R of rotation of the rotor 26 for applying the brake (a clockwise direction as viewed from the right side in FIGS. 4 and 5).

Figure 3:
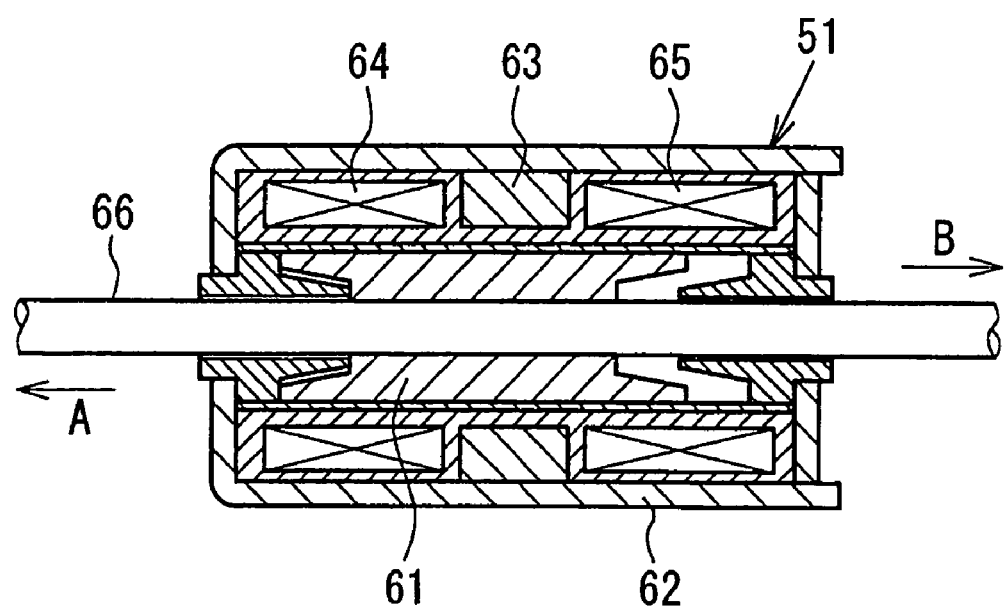
FIG. 3 is a cross-sectional view of a self-holding type solenoid used in the motor-driven brake system.

The solenoid (actuator) 51 is arranged as a bi-directional self-holding type solenoid. As shown in FIG. 3, the solenoid 51 is formed by a housing 62 in which a plunger 61 is slidably accommodated, two coils 64 and 65 provided in the housing 62 and connected in series, with a permanent magnet 63 being held therebetween, and a rod 66 supported by the plunger 61. By changing the direction of a current supplied to the coils 64 and 65, the plunger 61 is moved in one of two directions A and B, and held in a forward end position or a retracted end position under an attracting force of the permanent magnet 63.

Figure 1:
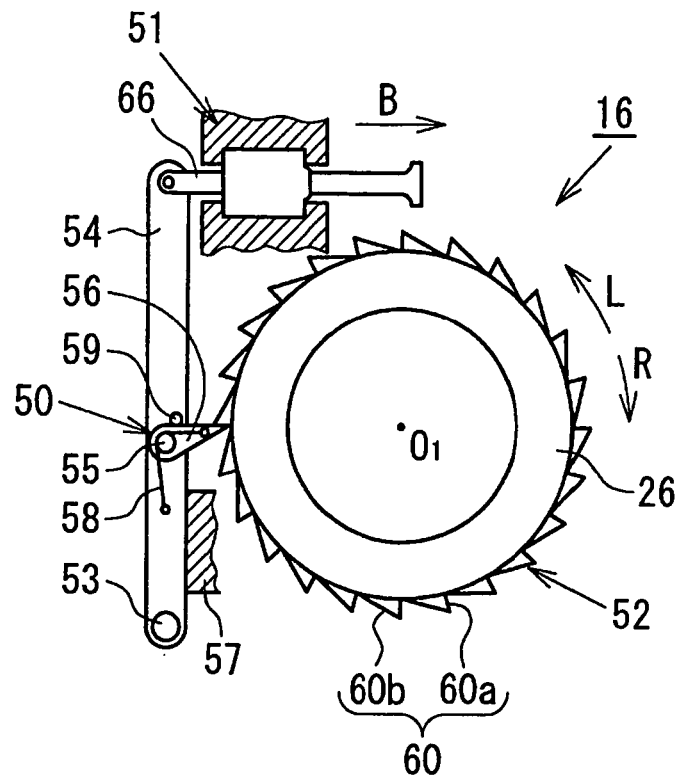
FIG. 1 is a schematic view of a parking brake lock mechanism used in a motor-driven brake system according to an embodiment of the present invention, which mechanism is in a locked condition.
Figure 2:
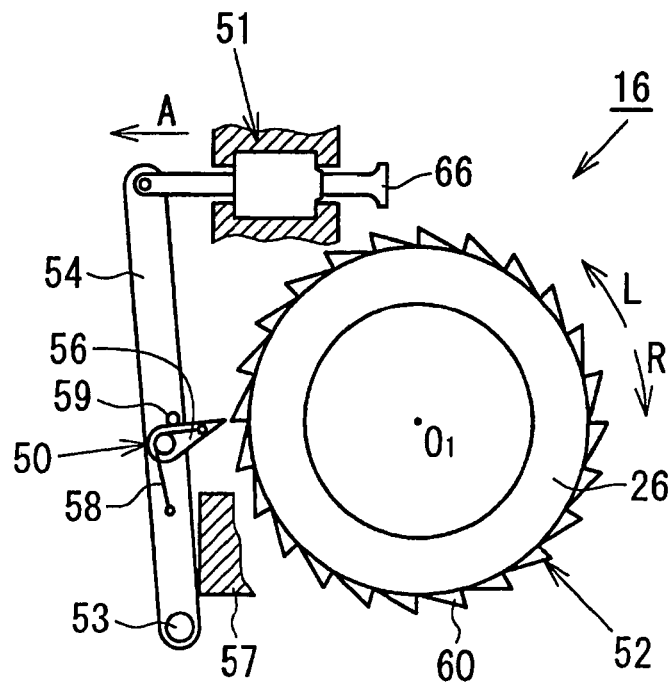
FIG. 2 is a schematic view of the parking brake lock mechanism, which is in an unlocked condition.

As indicated in FIGS. 1 and 2, the parking brake lock mechanism 16 is arranged such that the self-holding type solenoid 51 is provided in the caliper body 10, and one end of the rod 66 integral with the plunger 61 is pinned to a forward end portion of the pivot arm 54 on a side of the lock mechanism 50.

In the parking brake lock mechanism 16 arranged as mentioned above, when the solenoid 51 (the coils 64 and 65) is supplied with a current in one direction (a direction for unlocking), the rod 66, together with the plunger 61, moves in the leftward direction A in FIG. 2 (an advancing direction), and the pivot arm 54 pivotally moves away from the rotor 26, to thereby disengage a forward end portion of the engaging pawl 56 from the tooth portion 60 of the ratchet wheel 52. That is, the lock mechanism 50 performs an unlocking action, and consequently the rotor 26 becomes freely rotatable in either the direction L for releasing the brake or the direction R for braking. In this case, the plunger 61 is maintained at the forward end position even after deenergization. Therefore, temporary energization of the coil 64 can be employed. In this state, when the solenoid 51 (the coils 64 and 65) is supplied with a current in the other direction (a direction for locking), the rod 66, together with the plunger 61, moves in the rightward direction B in FIG. 1 (a retracting direction; a direction for locking), and the pivot arm 54 moves towards the rotor 26, thus bringing the forward end portion of the engaging pawl 56 into engagement with the tooth portion 60 of the ratchet wheel 52. That is, the lock mechanism 50 performs a locking action, and consequently the rotor 26 is prevented from rotating in the direction L for releasing the brake. In this case, since the plunger 61 is maintained at the retracted end position even after deenergization, temporary energization of the coil 65 can be employed.

Figure 6:
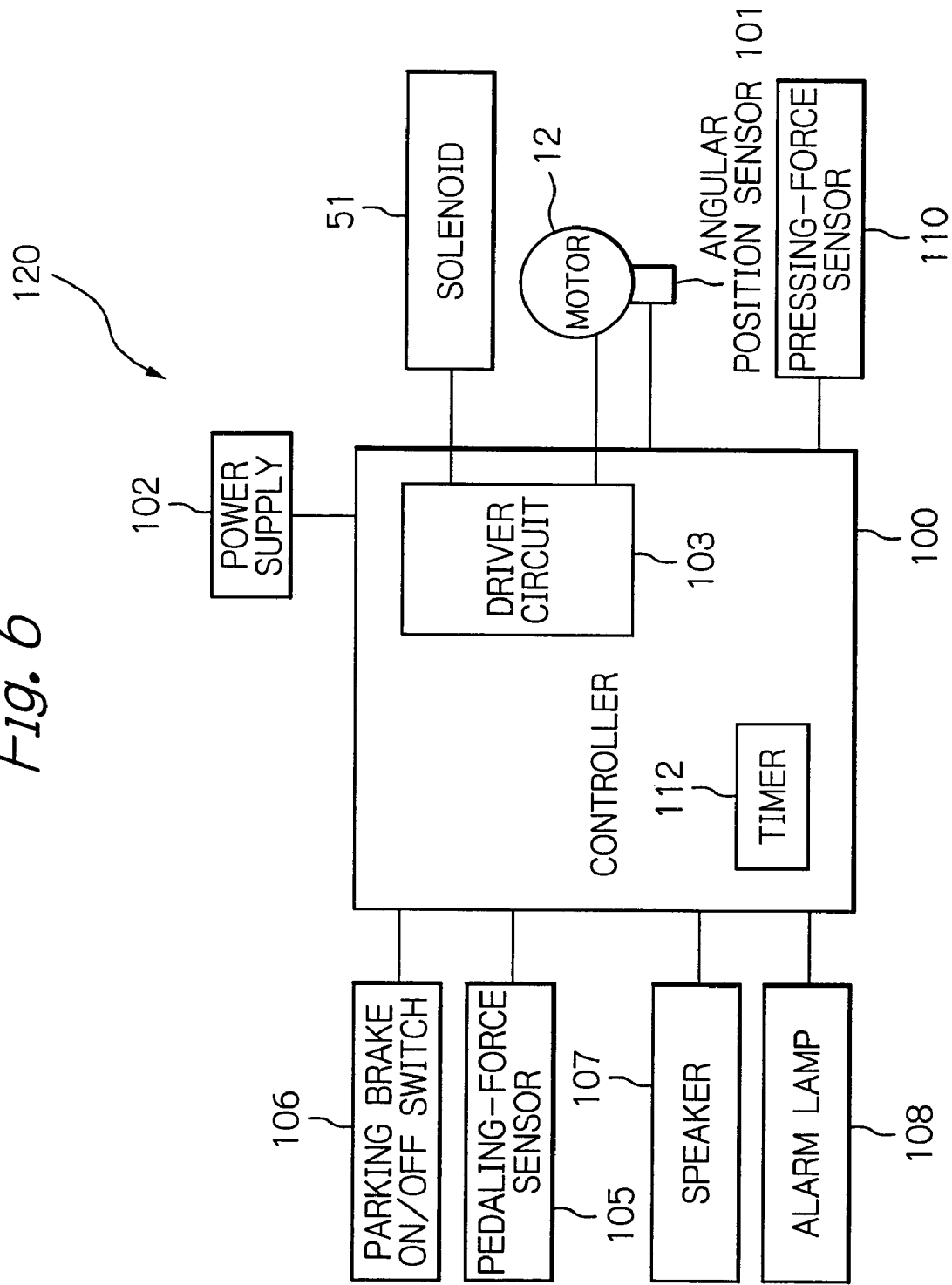
FIG. 6 is a circuit diagram showing a controller and members connected thereto in the motor-driven brake system.

As indicated in FIG. 6, power is supplied from a power supply 102 through a driver circuit 103 to the solenoid 51. The driver circuit 103 is controlled by the controller (control device) 100 to operate the solenoid 51. Power is also supplied from the power supply 102 through the driver circuit 103 to the motor 12. The driver circuit 103 is controlled by the controller 100 to operate the motor 12. Thus, the driver circuit 103 functions as both a solenoid driver and a motor driver. The controller 100 controls operation of the solenoid 51 and the motor 12 by controlling the supply of power (supply of or stopping supply of power) to the solenoid 51 and the motor 12 through the driver circuit 103.

The controller 100 is connected to the driver circuit 103 and the angular position sensor 101 which is formed by a resolver. The controller 100 is also connected to a pedaling force sensor 105, a parking brake on/off switch 106, a speaker 107, an alarm lamp 108 and a pressing-force sensor 110. The pressing-force sensor (pressing-force detecting means) 110 is disposed inside the shaft portion 21 of the piston 11 so as to detect a pressing force of the piston 11 and hence the brake pad 3, relative to the disk rotor D. The controller 100 controls operation of the pressing-force sensor 110 by controlling the supply of power (supply of or stopping supply of power) to the pressing-force sensor 110.

A timer 112 (elapsed time measuring means) for measuring a time elapsed during operation of the parking brake is connected to the controller 100. Thus, the controller 100 is capable of using the elapsed time measured by the timer 112.

Figure 7:
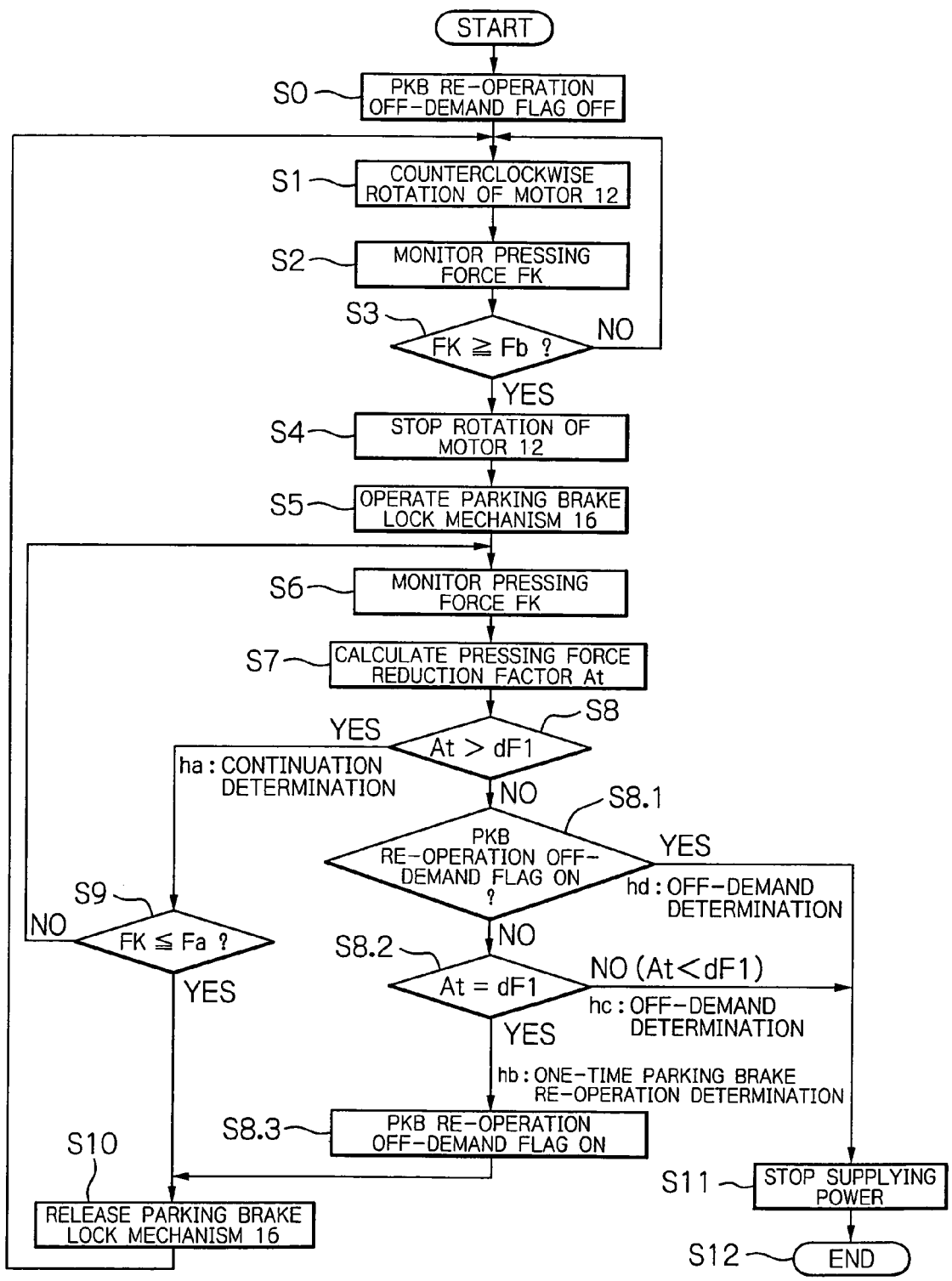
FIG. 7 is a flow chart indicating an operation for determining whether re-operation of the parking brake is necessary, which is executed by the controller in FIG. 6.

During application of the parking brake (PKB), the controller 100 executes an operation for determining whether re-operation of the parking brake is necessary, as indicated in FIG. 7 [the operation will be explained later in a description under [operation for determining whether re-operation of the parking brake is necessary]].

Hereinbelow, an operation of the motor-driven brake system arranged as mentioned above is described. There are four modes of operation, namely, [an operation for applying normal braking], [an operation for releasing normal braking], [an operation for applying the parking brake (PKB)], [an operation for releasing the parking brake] and [an operation for determining whether re-operation of the parking brake is necessary].

[An Operation for Applying Normal Braking]

For normal braking in which the motor-driven brake is operated, the rotor 26 of the motor 12 is rotated in a clockwise direction as viewed from the right side in FIGS. 4 and 5, in accordance with a driver's operation for applying the brake. In this instance, as indicated in FIG. 2, in the solenoid 51 of the parking brake lock mechanism 16, the rod 66 which is integral with the plunger 61 is located in a forward end position. The lock mechanism 50 is maintained in an unlocked condition, due to the self-holding function of the solenoid 51. Therefore, when the rotor 26 is rotated in the clockwise direction as described above, the eccentric plate 41, which is attached through the bearing 40 to the eccentric shaft 39 integral with the rotor 26, performs an orbital motion without being rotated on its axis. Due to this orbital motion of the eccentric plate 41, the cycloid ball reduction mechanism 43 is operated, and the first disk 31 of the ball ramp mechanism 13 rotates in a direction opposite to that of rotation of the rotor 26 (in the counterclockwise direction) with a predetermined rotation ratio N.

On the other hand, in the ball ramp mechanism 13, since the second disk 32 is prevented from rotating under a resistance force exerted by the wave washer 34, the second disk 32 advances towards the disk rotor D in accordance with rotation of the first disk 31. Consequently, the piston 11 thrusts, to thereby press the brake pad 3 on the inner side of the vehicle against the disk rotor D. Then, a reactive force acts to move the caliper 2 towards the carrier 1, and the claw portion 5a of the claw member 5 of the caliper 2 presses the brake pad 4 on the outer side of the vehicle against an outer surface of the disk rotor D, to thereby generate a braking force corresponding to the angle of rotation and the torque of the motor 12 (the current supplied to the motor). When the brake pads 3 and 4 become worn, as described above, the pad wear compensation mechanism 15 is operated to compensate for a space generated consequent to an amount of wear. During this braking, the self-holding type solenoid 51 is placed in a non-energized condition, and the lock mechanism 50 is maintained in an unlocked condition.

[An Operation for Releasing Normal Braking]

To release the motor-driven brake, that is, to release normal braking, in accordance with the driver's operation for releasing the brake, the rotor 26 of the motor 12 is rotated in a counterclockwise direction as viewed from the right side in FIGS. 4 and 5, and the second disk 32 and the piston 11 are retracted as a unit under biasing force of the Belleville spring 38, to thereby release the pressing force applied to the disk rotor D and thus release the motor-driven brake. In this instance, the self-holding type solenoid 51 is not energized; and the lock mechanism 50 of the parking brake lock mechanism 16 is maintained in an unlocked condition, so that the rotor 26 smoothly rotates in the direction L (FIG. 2) for releasing the brake.

[An Operation for Applying the Parking Brake (PKB)]

When a parking brake operation is requested, the motor 12 (the rotor 26) is rotated in a direction for generating a braking force (the clockwise direction R) to generate a thrusting force as requested (a target thrusting force).

Thereafter, the motor 12 (the rotor 26) is further rotated in the same direction (the clockwise direction R) by a predetermined amount (equal to a length corresponding to 1 pitch of the ratchet wheel 52, that is, one projection of the tooth portion 60), to thereby generate a braking force (a pressing force) greater than a desired level (the required pressing force). Then, the solenoid 51 (the coils 64 and 65) is supplied with a current in a direction for locking, to thereby move the plunger 61 in the direction B (a direction for locking).

According to the movement of the plunger 61 in the direction B, the engaging pawl 56 engages the tooth portion 60. In this state, the current supplied to the motor 12 is gradually reduced, and as a function of reversibility of the caliper 2, the piston 11 (the motor 12 and hence the rotor 26) gradually returns in a direction for reducing the braking force (the direction L for releasing the brake), that is, the rotor 26 (the ratchet wheel 52) rotates in the direction L for releasing the brake. Then, when the engaging pawl 56 reaches a tooth root (reference numeral thereof is omitted), the rotation of the rotor 26 (the ratchet wheel 52) in the direction L for releasing the brake stops, and the piston 11 stops moving in a direction for reducing the braking force.

The controller 100 detects a change in a value detected by the angular position sensor 101. With the lapse of a predetermined amount of time from the point of time at which no amount of change exists, the controller 100 reduces magnitudes of the currents supplied to the motor 12 and the solenoid 51 (the coils 64 and 65) to 0 (OFF). Even when the magnitudes of the currents supplied to the motor 12 and the solenoid 51 (the coils 64 and 65) become 0 (OFF), the engaging pawl 56 is engaged with the tooth root. Therefore, a parking brake function is exerted.

[An Operation for Releasing the Parking Brake (PKB)]

In response to a driver's operation for releasing the parking brake, to release the parking brake the coil 64 (FIG. 3) of the self-holding type solenoid 51 of the parking brake lock mechanism 16 is temporarily supplied with a current. Then, the rod 66, together with the plunger 61 in the solenoid 51, moves in the advancing direction A. As a result, the lock mechanism 50 is placed in an unlocked condition and, as indicated in FIG. 2, the rotor 26 becomes capable of freely rotating in the direction L for releasing the brake. In this instance, the motor 12 is not energized, so that the piston 11 is retracted due to a reactive force generated by braking, and accordingly, the second disk 32 is retracted and the rotor 26 of the motor 12 is rotated in the counterclockwise direction as viewed from the right side in FIGS. 4 and 5. The angle of rotation of the motor 12 is thus restored, and the parking brake is released.

[An Operation for Determining Whether Re-Operation of the Parking Brake is Necessary]

An operation for determining whether re-operation of the parking brake is necessary is effected during application of the parking brake. Hereinbelow, referring to FIG. 7, description is made with regard to the operation for determining whether re-operation of the parking brake is necessary, including the parking brake operation before re-operation of the parking brake and the operation after the re-operation of the parking brake.

In this operation, as indicated in FIG. 7, after a PKB re-operation off-demand flag (described later) is set to be off by the controller 100 (step S0), the controller 100 operates the motor 12 for rotation in a counterclockwise direction, to thereby increase a pressing force (step S1). The pressing force of the brake pad 3 relative to the disk rotor D which is generated by operation of the motor 12 (hereinafter, frequently referred to simply as "the pressing force") is detected by the pressing-force sensor 110 (step S2). The timer 112 measures elapsed time after a time point at which the pressing force was generated (step S1) during application of the parking brake. The elapsed time measured by the timer 112 is input to the controller 100.

Subsequently, it is determined whether the pressing force FK detected in step S2 is equal to or greater than a pressing force Fb which is slightly larger than a pressing force Fa required for parking (the required pressing force) (step S3).

In step S3, if it is determined that the pressing force FK is less than the pressing force Fb (the answer is NO), the program returns to step S, and steps S1 to S3 are repeated until the pressing force FK reaches the pressing force Fb.

In step S3, if it is determined that the pressing force FK is equal to or greater than the pressing force Fb (the answer is YES), the operation of the motor 12 is stopped (step S4). After the parking brake lock mechanism 16 is operated, supply of current to the motor 12 is stopped (step S5).

Thereafter, the controller 100 monitors a reduction in pressing force FK while receiving the pressing force FK input from the pressing-force sensor 110 (step S6). Based on the elapsed time measured by the timer 112 and an amount of reduction in pressing force FK as detected by the pressing-force sensor 110 when the elapsed time is measured, a pressing force reduction factor At [an amount by which the pressing force is reduced per unit time (which time is shorter than the time between 0 and T1 in FIG. 10), that is, a rate of change in the amount of reduction in pressing force] is determined (step S7). Based on the pressing force reduction factor At, it is determined whether re-operation of the parking brake by the parking brake lock mechanism 16 is necessary (step S8).

The pressing force reduction factor At is explained below.

Figures 8, 9:
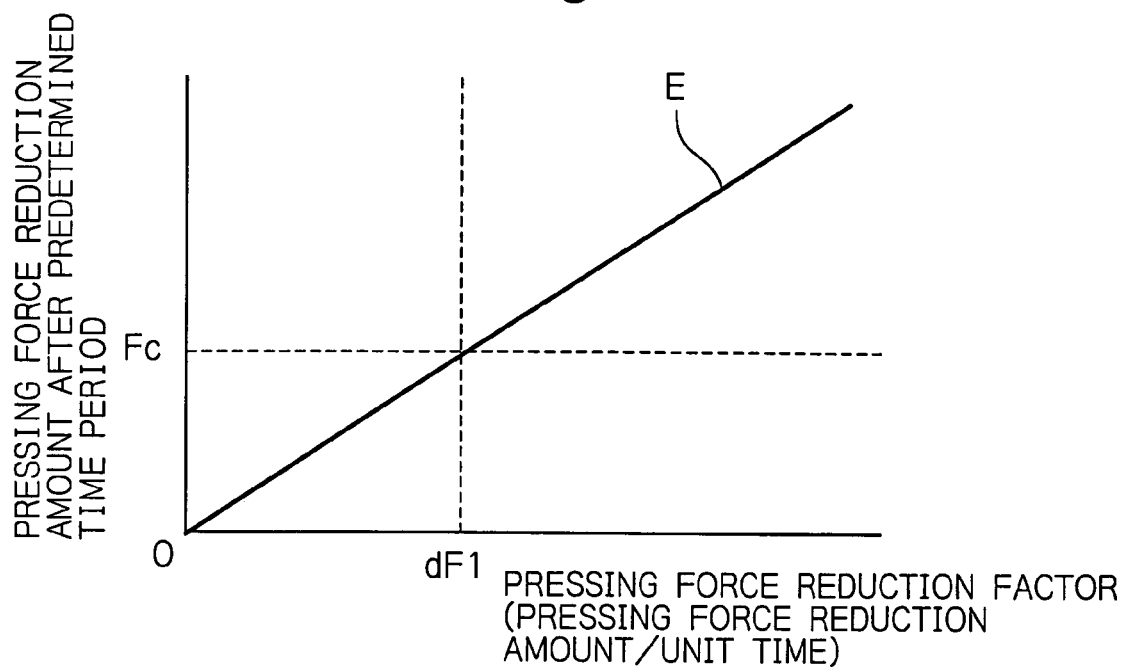
FIG. 8 is a characteristic chart indicating a correspondence between a pressing force reduction factor and an amount of reduction in pressing force.
FIG. 9 is a table indicating an example of a content of an operation executed in step S8 in FIG. 7.

If the pressing force is continuously reduced over a predetermined time period with a certain pressing force reduction factor At, an amount of reduction in the pressing force after said predetermined time period is obtained by multiplying the pressing force reduction factor At by the predetermined time period. The amount of reduction in the pressing force and the pressing force reduction factor At have a proportional relationship which is, for example, as indicated by a straight line E in FIG. 8. As shown in FIG. 8, when the pressing force reduction factor At is large, the amount of reduction in the pressing force after the predetermined time period is large. When the pressing force reduction factor At is small, the amount of reduction in the pressing force after the predetermined time period is small.

After generation of the pressing force, the pressing force is reduced with time and a consequent lowering of temperature of the brake pads 3 and 4. In this instance, the pressing force is not reduced with a constant pressing force reduction factor At. The pressing force reduction factor At is gradually reduced and finally becomes 0, as indicated by slopes of the curved lines A and B in FIG. 10 (in the right-side portion of FIG. 10) [the reduction in pressing force converges (or is saturated)].

In the determination in step S8 (for determining whether re-operation of the parking brake is necessary), the pressing force reduction factor At is compared with a pressing force reduction factor reference value dF1 which is preliminarily determined as described later, and it is determined whether the pressing force reduction factor At is greater than the reference value dF1 (At>dF1). In step S8.2, it is determined whether the pressing force reduction factor At is equal to the reference value dF1 (At=dF1) or smaller than the reference value dF1 (At<dF1). For convenience sake, the above determinations are referred to as "the continuation determination ha", "the one-time parking brake re-operation determination hb", and "the parking brake re-operation off-demand determination hc" or "the parking brake re-operation off-demand determination hd" in the order described. Thus, the operation is conducted according to a determination result.

Once the equality (At=dF1) determination is carried out in step S8.2, in step S8.1 in the next cycle of operation, it is determined whether the PKB re-operation off-demand flag is on. If the PKB re-operation off-demand flag is on, the parking brake re-operation off-demand determination hd is made. In the parking brake re-operation off-demand determination hd, the program advances to step S11, in which the supply of power to the solenoid 51, the motor 12, the pressing-force sensor 110, the timer 112 and the controller 100 (for convenience sake, hereinafter collectively referred to as "the control unit 120") is stopped. [This includes continuing stopping the supply of power if the supply of power is already stopped (in this stage, for example, the supply of power to the solenoid 51 and the motor 12 is already stopped). The same applies to the operations described later.] The operation for determining whether re-operation of the parking brake is necessary is thus completed (step S12).

Explanation is made below with regard to the pressing force reduction factor reference value dF1.

The pressing force reduction factor reference value dF1 is determined as follows, by using a simulating machine corresponding to an actual machine or by simulation. An elapsed time-pressing force reduction amount characteristic (such as that indicated by the curved line A or B in FIG. 10 in which the pressing force reduction factor At is gradually reduced nearly to 0) is first determined. Then, from the elapsed time-pressing force reduction amount characteristic, a pressing force reduction factor At-pressing force reduction amount characteristic is obtained, and the pressing force reduction factor reference value dF1 is determined, based on this characteristic.

That is, as described later, when the pressing force reduction factor At is equal to the pressing force reduction factor reference value dF1 (At=dF1), re-operation of the parking brake is conducted once (the final parking brake operation) (the program returns to step S1 through step S10). The pressing force reduction factor reference value dF1 is determined such that in the final parking brake operation, the pressing force becomes equal to or greater than the required pressing force Fa at the time the pressing force reduction factor At becomes substantially 0.

Now, referring again to FIG. 7, further explanation is given with regard to the operation for determining whether re-operation of the parking brake is necessary.

In step S8, when the pressing force reduction factor At is greater than the pressing force reduction factor reference value dF1 (At>dF1), the continuation determination ha for continuing prediction is made, and, in consideration of a large reduction in the pressing force, it is determined whether the pressing force FK is equal to or less than the required pressing force Fa (FK≦Fa?) (step S9). In step S9, if it is determined that the pressing force FK is not equal to or less than the required pressing force Fa (the answer is NO), the program returns to step S6, and steps S6 to S8 are repeated.

Figure 10:
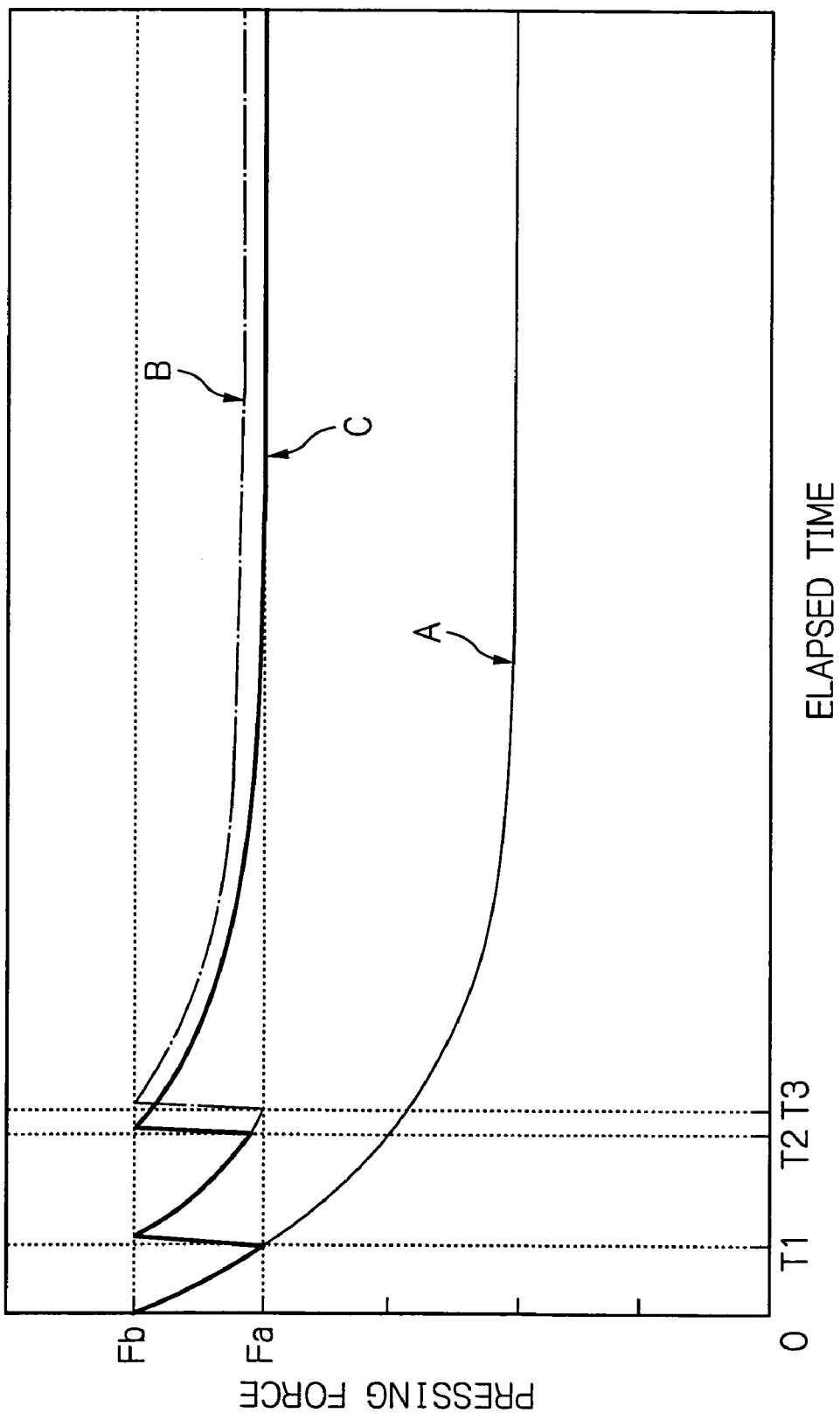
FIG. 10 is a diagram for explaining a pressing force-elapsed time characteristic in the embodiment of the present invention and in the prior art.

In step S8.1, if the parking brake re-operation off-demand flag is not on, the program advances to step S8.2, and it is determined whether the pressing force reduction factor At is equal to the pressing force reduction factor reference value dF1 (At=dF1). If At=dF1, the one-time parking brake re-operation determination hb is made. In step S8.3, the PKB re-operation off-demand flag is set to be on, which indicates that the one-time parking brake re-operation determination hb has been made. For the final parking brake re-operation, the parking brake lock mechanism 16 is released (step S10), and the program returns to step S1, followed by execution of steps S1 to S8. In steps S1 to S8 in this instance, for example, as shown in FIG. 10, the parking brake operation is conducted once when the amount of reduction in the pressing force FK becomes Fc=(Fb−Fa') [wherein Fa' is slightly larger than Fa] (at time T2). Thereafter, the program advances to step S11 as described above, and the supply of power to the control unit 120 is stopped, to thereby complete the operation for determining whether re-operation of the parking brake is necessary (step S12). A curved line C is indicated in comparison with the curved lines A and B. The line C indicates a pressing force-time characteristic when re-operation of the parking brake is conducted one more time at time T2.

In step S9, if it is determined that the pressing force FK is equal to or less than the required pressing force Fa (the answer is YES), the program advances to step S10, and returns to step S1. Steps 1 to 8 are carried out.

In step S8.2, if the pressing force reduction factor At is smaller than the pressing force reduction factor reference value dF1 (At<dF1), the parking brake re-operation off-demand determination hc is made. The supply of power to the control unit 120 is stopped (step S11), and the operation for determining whether re-operation of the parking brake is necessary (prediction conducted by the pressing force reduction predicting means) is completed (step S12).

As has been described above, according to the present embodiment, the pressing force reduction factor At is determined from the elapsed time measured by the timer (elapsed time measuring means) 112 and the amount of reduction in the pressing force as detected by the pressing-force sensor (pressing force detecting means) 110 when the elapsed time is measured. Meanwhile, after the parking brake is applied by means of the parking brake lock mechanism 16, the pressing force FK of the brake pad 3 relative to the disk rotor D is gradually reduced due to contraction of the brake pad 3, which occurs with time and a consequent lowering of its temperature.

As a countermeasure, using the pressing force reduction factor At determined in the above-mentioned manner, it is possible to predict that the pressing force FK will become the pressing force (the required pressing force) Fa required for maintaining the parking brake function before the pressing force FK is actually reduced to the required pressing force Fa. Therefore, it is possible to stop the supply of power to the control unit 120 in an early stage. That is, as compared to a conventional technique in which the pressing force is continuously checked and re-operation of the parking brake is conducted at the time the pressing force becomes, or substantially becomes, the required pressing force, the supply of power can be stopped earlier, thus suppressing consumption of power (excessive consumption of power can be avoided).

It should be noted that in the present embodiment, the operations in steps S6 to S8.2 in the flow chart of FIG. 7 provide the pressing force reduction predicting means. Steps S8, S9 and S10 provide the parking brake re-operation controlling means. Steps S8.1, S8.2 and S11 provide the parking brake operation completing means.

Figure 11:
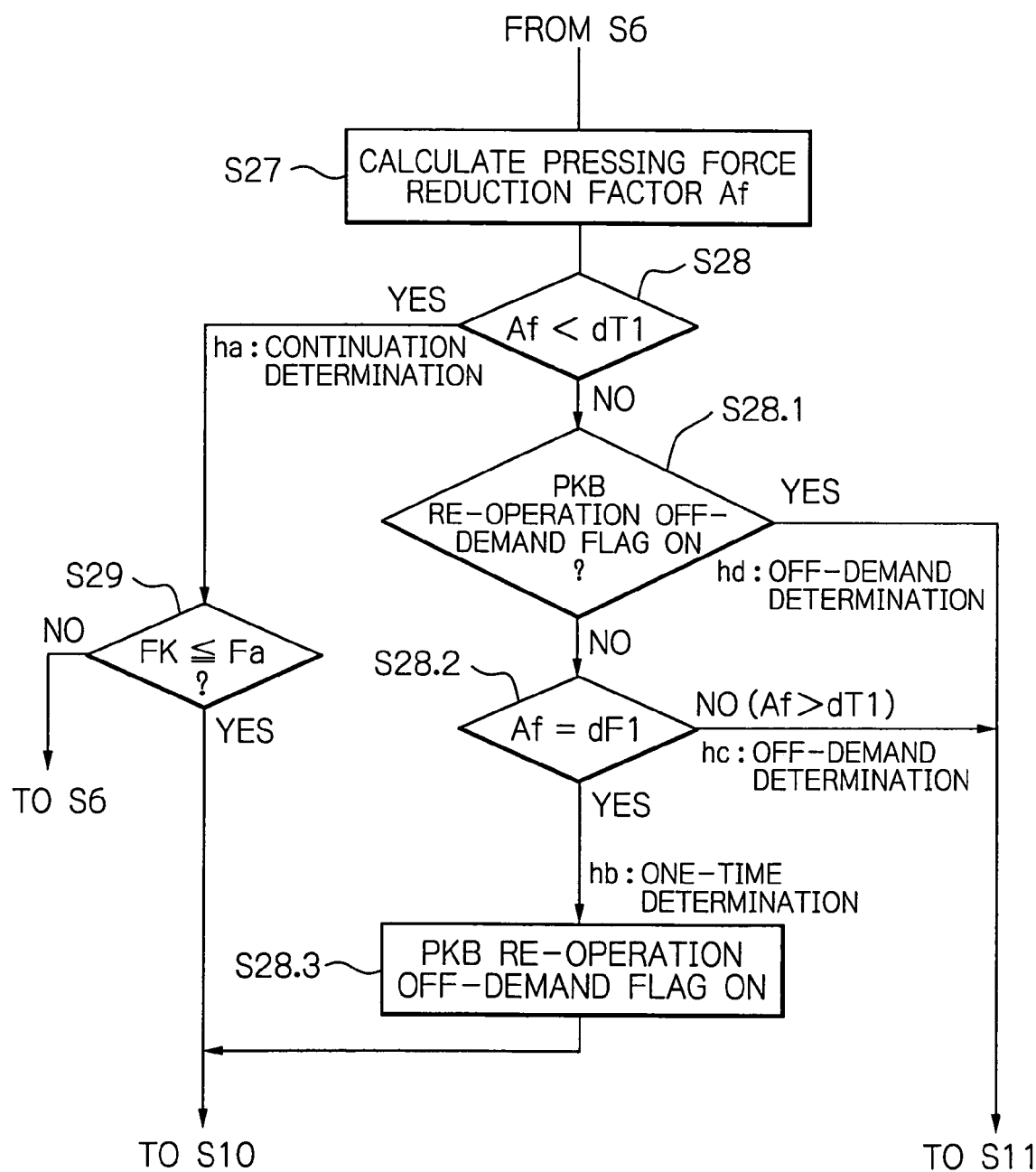
FIG. 11 is a flow chart indicating an operation for determining whether re-operation of the parking brake is necessary, which is executed by the controller according to another embodiment of the present invention.

In the above-mentioned embodiment, an amount of reduction in the pressing force per unit time is used as the pressing force reduction factor At. However, this does not limit the present invention. For example, the pressing force reduction factor may be a difference between an amount of reduction in the pressing force per unit time for the previous cycle of operation and an amount of reduction in the pressing force per unit time for the current cycle of operation. In this case, the difference becomes small when a reduction in the pressing force becomes moderate. Therefore, it is possible to predict that the pressing force will become the required pressing force Fa by determining if the difference is smaller than a reference value. The pressing force reduction factor may be an elapsed time per unit amount of reduction. In this case, steps S7 to S9 in the flow chart of FIG. 7 are replaced by steps S27 to S29 as shown in FIG. 11, and a pressing force reduction factor Af [elapsed time per unit amount of reduction (which amount is smaller than the amount of reduction from Fb to Fa in FIG. 10, that is, a rate of change in elapsed time)] is determined from the elapsed time obtained by the timer 112 and the amount of reduction in the pressing force FK as detected by the pressing-force sensor 110 when the elapsed time is measured (step S27). Based on the pressing force reduction factor Af, it is determined whether re-operation of the parking brake by the parking brake lock mechanism 16 is necessary (step S28).

In the determination made in step S28 (for determining whether re-operation of the parking brake is necessary), the pressing force reduction factor Af is compared with a pressing force reduction factor reference value dT1 which is preliminarily determined as described later, and it is determined whether the pressing force reduction factor Af is greater than the reference value dT1 (At>dT1). In step S28.2, it is determined whether the pressing force reduction factor Af is equal to the reference value dT1 (At=dT1) or smaller than the reference value dT1 (At<dT1). [As in the above-described embodiment, these determinations are referred to as "the continuation determination ha", "the one-time parking brake re-operation determination hb", and "the parking brake re-operation off-demand determination hc" or "the parking brake re-operation off-demand determination hd" in the order described.] Thus, the operation is conducted according to a determination result. As in the case of the pressing force reduction factor reference value dF1, the pressing force reduction factor reference value dT1 is determined from an elapsed time-pressing force reduction characteristic, by using a simulating machine corresponding to an actual machine or by simulation.

In step S28, if the pressing force reduction factor Af is smaller than the pressing force reduction factor reference value dT1 (Af<dT1), the continuation determination ha is made, and, in consideration of a large reduction in pressing force, it is determined whether the pressing force FK is equal to or less than the required pressing force Fa (FK≦Fa?) (step S29). In step S29, if it is determined that the pressing force FK is not equal to or less than the required pressing force Fa (the answer is NO), the program returns to step S6.

In step S28.1, if the parking brake re-operation off-demand flag is not on, the program advances to step S28.2, in which it is determined whether the pressing force reduction factor Af is equal to the pressing force reduction factor reference value dT1 (Af=dT1). If Af=dT1, the one-time parking brake re-operation determination hb is made. Then, in step S28.3, the PKB re-operation off-demand flag is set to be on, which indicates that the one-time parking brake re-operation determination hb has been made. Thereafter, the program advances to step S10.

In step S29, if it is determined that the pressing force FK is equal to or less than the required pressing force Fa (the answer is YES), the program advances to step S10, and returns to step S1. Steps 1 to 8 are then carried out.

In step S28.1, if the parking brake re-operation off-demand flag is on, and in step S28.2, if the pressing force reduction factor Af is larger than the pressing force reduction factor reference value dT1 (Af>dT1), the parking brake re-operation off-demand determinations hd and hc are made. Then, the program advances to step S11.

Thus, the same effects as obtained in the above-mentioned embodiment can be exerted when the elapsed time per unit amount of reduction is used as the pressing force reduction factor.

Although the determination of the necessity of re-operation of the parking brake is made based on the pressing force reduction factor, this does not limit the present invention. In the present invention, the determination may be made, based on (1) an amount of reduction in pressing force when a predetermined amount of time elapses, (2) an amount of time that elapses before the amount of reduction reaches a predetermined level, (3) a pressing force value when a predetermined amount of time elapses, or (4) an amount of time that elapses before the pressing force value reaches a predetermined value. Hereinbelow, referring to FIGS. 12 to 15, description is made with regard to modified examples 1 to 4 which employ the above determination factors (1) to (4), respectively.

In modified examples 1 to 4 explained below, the operations in steps S7 to S9 in the flow chart in FIG. 7 are replaced, and only the portions that replace steps S7 to S9 are described in the following explanation.

Figure 12:
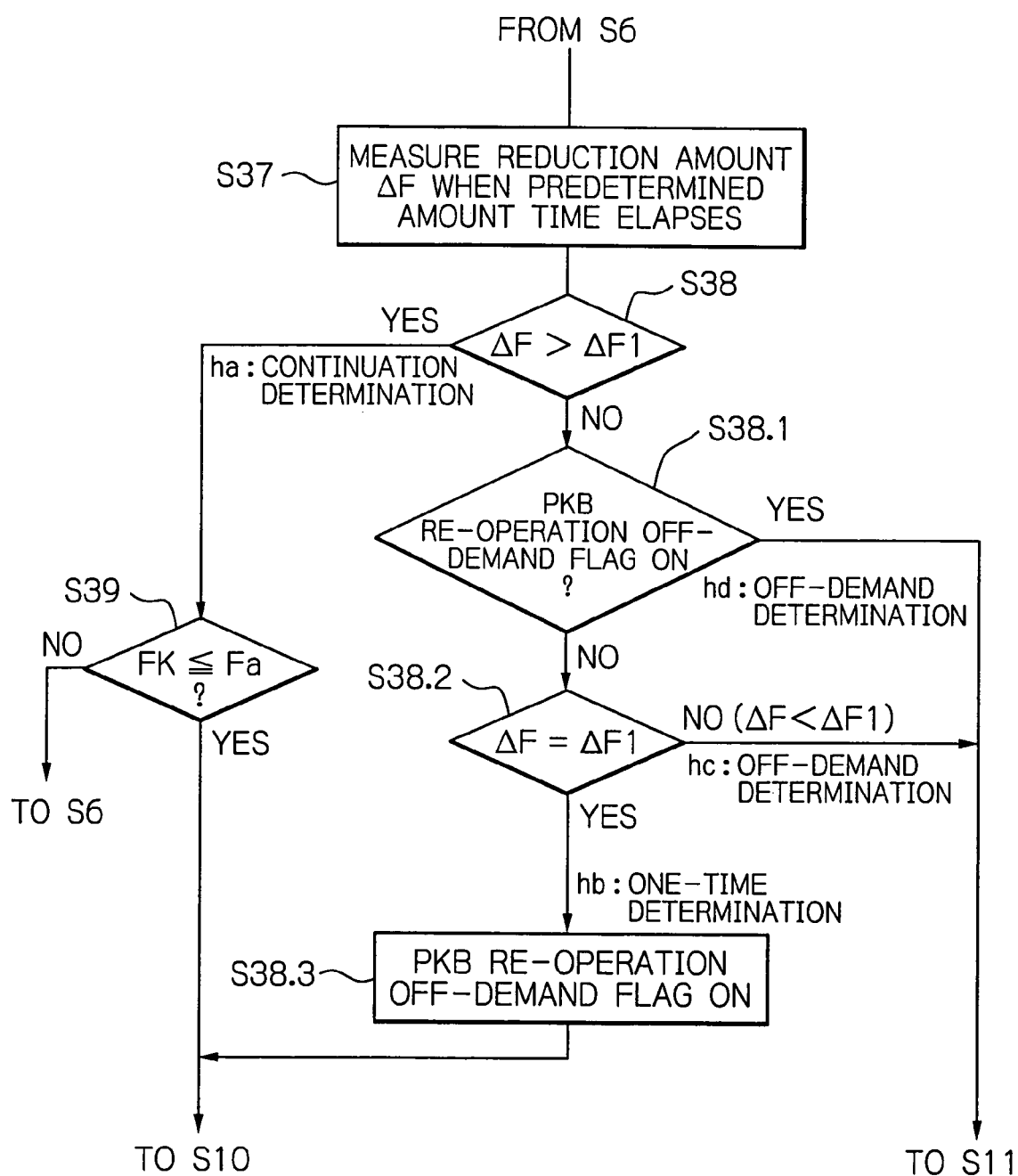
FIG. 12 is a flow chart indicating an operation for determining whether re-operation of the parking brake is necessary, which is executed by the controller according to modified example 1.

The determination factor of modified example 1 is an amount of reduction in pressing force when a predetermined amount of time elapses. As indicated in FIG. 12, a reduction amount $\Delta F$ when a predetermined amount of time elapses is determined from the pressing force FK as detected by the pressing-force sensor 110 when the predetermined amount of time is measured by the timer 112 (step S37). Based on the reduction amount $\Delta F$, it is determined whether re-operation of the parking brake by the parking brake lock mechanism 16 is necessary (step S38).

In the determination in step S38 (for determining whether re-operation of the parking brake is necessary), the reduction amount $\Delta F$ is compared with a reduction amount reference value $\Delta F1$ which is preliminarily determined as described later, and it is determined whether the reduction amount $\Delta F$ is greater than the reference value $\Delta F1$ ($\Delta F > \Delta F1$). In step S38.2, it is determined whether the reduction amount $\Delta F$ is equal to the reference value $\Delta F1$ ($\Delta F = \Delta F1$) or smaller than the reference value $\Delta F1$ ($\Delta F < \Delta F1$). [As in the above-described embodiment, these determinations are referred to as "the continuation determination ha", "the one-time parking brake re-operation determination hb", and "the parking brake re-operation off-demand determination hc" or "the parking brake re-operation off-demand determination hd" in the order described.] Thus, the operation is conducted according to a determination result. The reduction amount reference value $\Delta F1$ is smaller than an amount of reduction from Fb to Fa in FIG. 10, and is determined from an elapsed time-pressing force reduction amount characteristic, by using a simulating machine corresponding to an actual machine or by simulation.

In step S38, when the reduction amount $\Delta F$ is greater than the reduction amount reference value $\Delta F1$ ($\Delta F > \Delta F1$), the continuation determination ha is made, and, in consideration of a large reduction in pressing force, it is determined whether the pressing force FK is equal to or less than the required pressing force Fa (FK$\leq$Fa?) (step S39). In step S39, if it is determined that the pressing force FK is not equal to or less than the required pressing force Fa (the answer is NO), the program returns to step S6, and a reduction amount $\Delta F$ when a predetermined amount of time elapses is determined again from the pressing force FK as detected by the pressing-force sensor 110 when the predetermined amount of time is measured by the timer 112 (step S37).

In step S38.1, if the parking brake re-operation off-demand flag is not on, the program advances to step S38.2, in which it is determined whether the reduction amount $\Delta F$ is equal to the reduction amount reference value $\Delta F1$ ($\Delta F = \Delta F1$). If $\Delta F = \Delta F1$, the one-time parking brake re-operation determination hb is made. Then, in step S38.3, the PKB re-operation off-demand flag is set to be on, which indicates that the one-time parking brake re-operation determination hb has been made. Thereafter, the program advances to step S10.

In step S39, if it is determined that the pressing force FK is equal to or less than the required pressing force Fa (the answer is YES), the program advances to step S10.

In step S38.1, if the parking brake re-operation off-demand flag is on, and in step S38.2, if the reduction amount $\Delta F$ is smaller than the reduction amount reference value $\Delta F1$ ($\Delta F < \Delta F1$), the parking brake re-operation off-demand determinations hd and hc are made. Then, the program advances to step S11.

Figure 13:
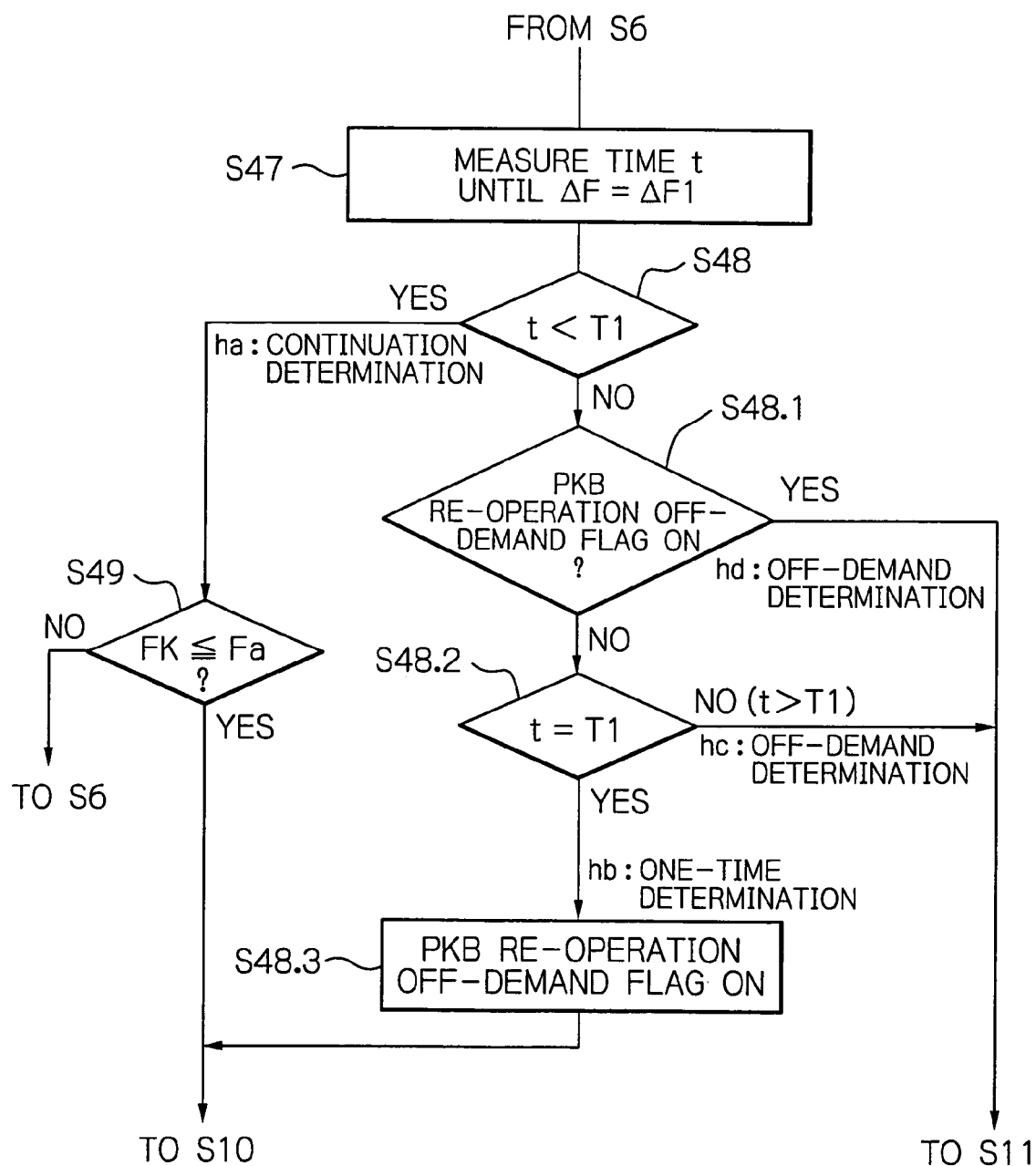
FIG. 13 is a flow chart indicating an operation for determining whether re-operation of the parking brake is necessary, which is executed by the controller according to modified example 2.

The determination factor of modified example 2 is elapsed time until the pressing force is reduced by a predetermined amount. As indicated in FIG. 13, elapsed time t obtained by the timer 112 before the pressing force FK detected by the pressing-force sensor 110 is reduced by a predetermined amount $\Delta F1$ is determined (step S47). Based on the elapsed time t, it is determined whether re-operation of the parking brake by the parking brake lock mechanism 16 is necessary (step S48).

In the determination in step S48 (for determining whether re-operation of the parking brake is necessary), the elapsed time t is compared with a reduction time reference value T1 which is preliminarily determined as described later, and it is determined whether the elapsed time t is smaller than the reduction time reference value T1 (t<T1). In step S48.2, it is determined whether the elapsed time t is equal to the reduction time reference value T1 (t=T1) or greater than the reduction time reference value T1 (t>T1). [As in the above-described embodiment, these determinations are referred to as "the continuation determination ha", "the one-time parking brake re-operation determination hb", and "the parking brake re-operation off-demand determination hc" or "the parking brake re-operation off-demand determination hd" in the order described.] Thus, the operation is conducted according to a determination result. The reduction time reference value T1 is an amount of time smaller than that between 0 and T1 in FIG. 10, and is determined from an elapsed time-pressing force reduction amount characteristic, by using a simulating machine corresponding to an actual machine or by simulation.

In step S48, when the elapsed time t is smaller than the reduction time reference value T1 (t<T1), the continuation determination ha is made, and, in consideration of a rapid reduction in the pressing force, it is determined whether the pressing force FK is equal to or less than the required pressing force Fa (FK$\leq$Fa?) (step S49). In step S49, if it is determined that the pressing force FK is not equal to or less than the required pressing force Fa (the answer is NO), the program returns to step S6, and determination is made again with respect to elapsed time t obtained by the timer 112 before the pressing force FK detected by the pressing-force sensor 110 is reduced by the predetermined reduction amount $\Delta F1$ (step S47).

In step S48.1, if the parking brake re-operation off-demand flag is not on, the program advances to step S48.2, and it is determined whether the elapsed time t is equal to the reduction time reference value T1 (t=T1). If t=T1, the one-time parking brake re-operation determination hb is made. Then, in step S48.3, the PKB re-operation off-demand flag is set to be on, which indicates that the one-time parking brake re-operation determination hb has been made. Thereafter, the program advances to step S10.

In step S49, if it is determined that the pressing force FK is equal to or less than the required pressing force Fa (the answer is YES), the program advances to step S10.

In step S48.1, if the parking brake re-operation off-demand flag is on, and in step S48.2, if the elapsed time t is greater than the reduction time reference value T1 (t>T1), the parking brake re-operation off-demand determination hc is made. Then, the program advances to step S11.

Figure 14:
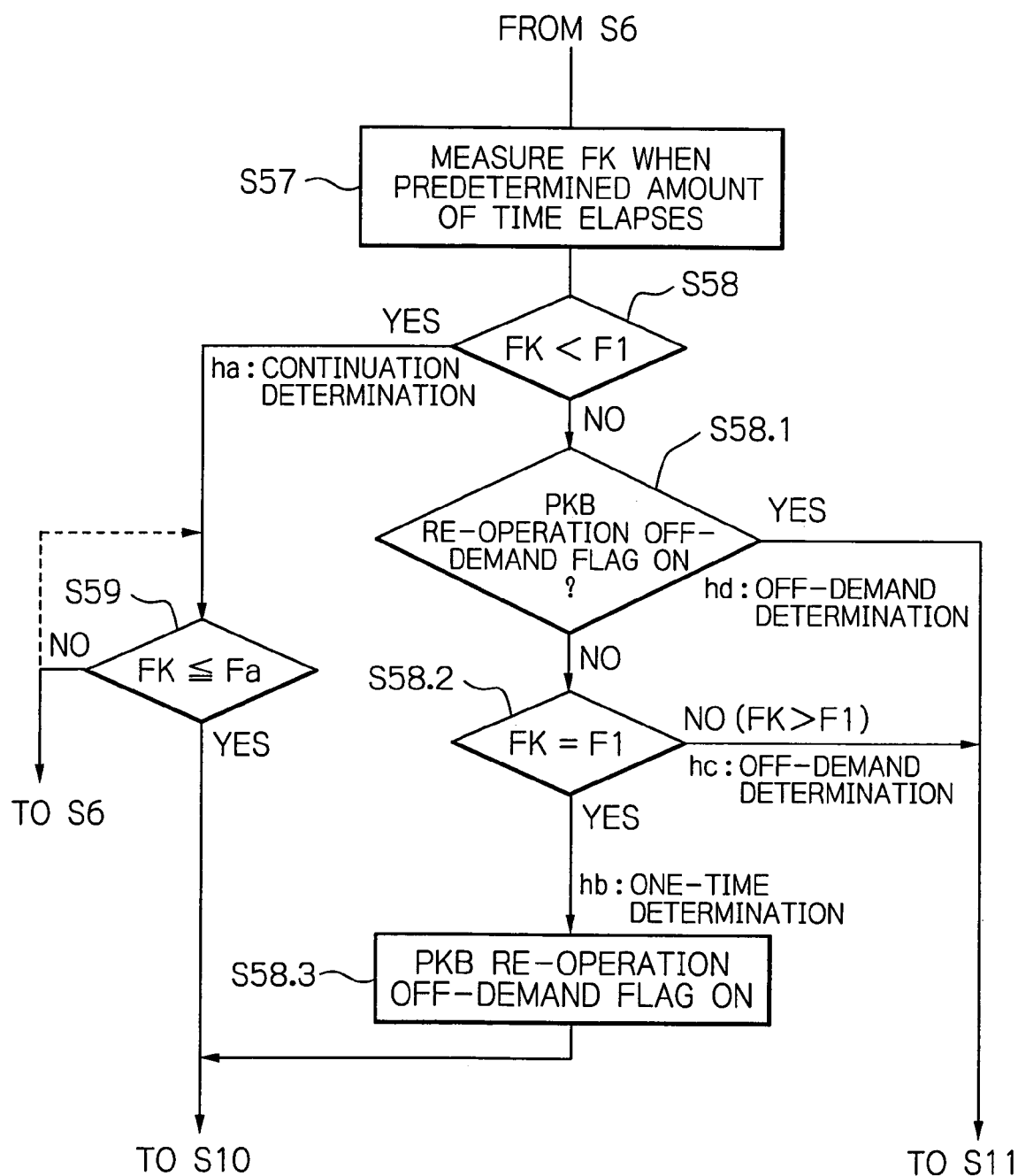
FIG. 14 is a flow chart indicating an operation for determining whether re-operation of the parking brake is necessary, which is executed by the controller according to modified example 3.

The determination factor of modified example 3 is a pressing force value when a predetermined amount of time elapses. As indicated in FIG. 14, a pressing force FK detected by the pressing-force sensor 110 when a lapse of a predetermined amount of time is measured by the timer 112 is determined (step S57). Based on the pressing force FK, it is determined whether re-operation of the parking brake by the parking brake lock mechanism 16 is necessary (step S58).

In the determination in step S58 (for determining whether re-operation of the parking brake is necessary), the pressing force FK is compared with a pressing force reference value F1 which is preliminarily determined as described later, and it is determined whether the pressing force FK is smaller than the pressing force reference value F1 (FK<F1). In step S58.2, it is determined whether the pressing force FK is equal to the pressing force reference value F1 (FK=F1) or greater than the pressing force reference value F1 (F>F1). [As in the above-described embodiment, these determinations are referred to as "the continuation determination ha", "the one-time parking brake re-operation determination hb", and "the parking brake re-operation off-demand determination hc" or "the parking brake re-operation off-demand determination hd" in the order described.] Thus, the operation is conducted according to a determination result. The pressing force reference value F1 is a value between Fb and Fa in FIG. 10, and is determined from an elapsed time-pressing force characteristic, using a simulating machine corresponding to an actual machine or by simulation.

In step S58, when the pressing force FK is smaller than the pressing force reference value F1 (FK<F1), the continuation determination ha is made, and, in consideration of a large reduction in pressing force, it is determined whether the pressing force FK is equal to or less than the required pressing force Fa (FK≦Fa?) (step S59). In step S59, if it is determined that the pressing force FK is not equal to or less than the required pressing force Fa (the answer is NO), the program returns to step S6, and determination is made again with respect to a pressing force FK as detected by the pressing-force sensor 110 when a lapse of a predetermined amount of time is measured by the timer 112 (step S57).

In step S58.1, if the parking brake re-operation off-demand flag is not on, the program advances to step S58.2, in which it is determined whether the pressing force FK is equal to the pressing force reference value F1 (FK=F1). If FK=F1, the one-time parking brake re-operation determination hb is made. Then, in step S58.3, the PKB re-operation off-demand flag is set to be on, which indicates that the one-time parking brake re-operation determination hb has been made. Thereafter, the program advances to step S10.

In step S59, if it is determined that the pressing force FK is equal to or less than the required pressing force Fa (the answer is YES), the program advances to step S10.

In step S58.1, if the parking brake re-operation off-demand flag is on, and in step S58.2, if the pressing force FK is greater than the pressing force reference value F1 (FK>F1), the parking brake re-operation off-demand determination hc is made. Then, the program advances to step S11.

In modified example 3, in step S58, when the pressing force FK is smaller than the pressing force reference value F1 (FK<F1), the continuation determination ha is made, and the program returns to step S6 through step S59. In this case, however, the pressing force FK continues to be smaller than the pressing force reference value F1 (FK<F1). Therefore, after the continuation determination ha is made, even when it is determined in step S59 that the pressing force FK is not equal to or less than the required pressing force Fa (the answer is NO), the program may return to step S59 without returning to step S6, as indicated by a dot line.

Figure 15:
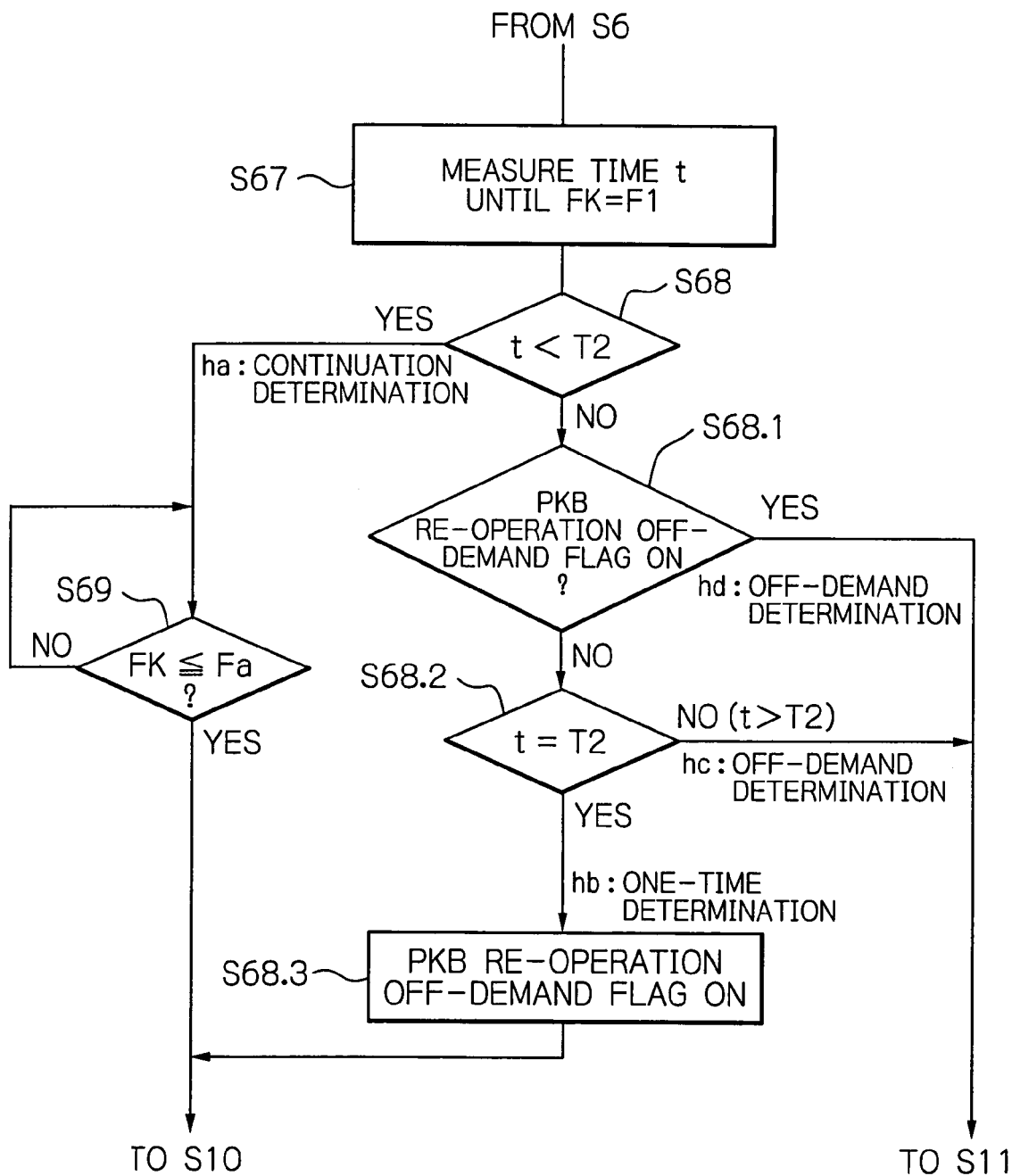
FIG. 15 is a flow chart indicating an operation for determining whether re-operation of the parking brake is necessary, which is executed by the controller according to modified example 4.

Finally in modified example 4, the determination factor is elapsed time until the pressing force reaches a predetermined pressing force value. As indicated in FIG. 15, elapsed time t obtained by the timer 112 before the pressing force FK detected by the pressing-force sensor 110 becomes a predetermined pressing force value F1 is determined (step S67). Based on the elapsed time t, it is determined whether re-operation of the parking brake by the parking brake lock mechanism 16 is necessary (step S68).

In the determination in step S68 (for determining whether re-operation of the parking brake is necessary), the elapsed time t is compared with a predetermined reduction time reference value T2 which is preliminarily determined as described later, and it is determined whether the elapsed time t is smaller than the reduction time reference value T2 (t<T2). In step S68.2, it is determined whether the elapsed time t is equal to the reduction time reference value T2 (t=T2) or greater than the reduction time reference value T2 (t>T2). [As in the above-described embodiment, these determinations are referred to as "the continuation determination ha", "the one-time parking brake re-operation determination hb", and "the parking brake re-operation off-demand determination hc" or "the parking brake re-operation off-demand determination hd" in the order described.] Thus, the operation is conducted according to a determination result. The reduction time reference value T2 is an amount of time smaller than that between 0 and T1 in FIG. 10, and is determined from an elapsed time-pressing force characteristic, using a simulating machine corresponding to an actual machine or by simulation.

In step S68, when the elapsed time t is smaller than the reduction time reference value T2 (t<T2), the continuation determination ha is made, and, in consideration of a rapid reduction in the pressing force, it is determined whether the pressing force FK is equal to or less than the required pressing force Fa (FK≦Fa?) (step S69). In step S69, if it is determined that the pressing force FK is not equal to or less than the required pressing force Fa (the answer is NO), the program returns to step S69. Step S69 is repeated until it is determined that the pressing force FK is equal to or less than the required pressing force Fa (the answer is YES). When the answer is YES, the program advances to step S10.

In step S68.1, if the parking brake re-operation off-demand flag is not on, the program advances to step S68.2, and it is determined whether the elapsed time t is equal to the reduction time reference value T2 (t=T2). If t=T2, the one-time parking brake re-operation determination hb is made. Then, in step S68.3, the PKB re-operation off-demand flag is set to be on, which indicates that the one-time parking brake re-operation determination hb has been made. Thereafter, the program advances to step S10.

In step S68.1, if the parking brake re-operation off-demand flag is on, and in step S68.2, if the elapsed time t is greater than the reduction time reference value T2 (t>T2), the parking brake re-operation off-demand determination hc is made. Then, the program advances to step S11.

Thus, the same effects as obtained in the above-mentioned embodiment can be exerted when use is made of, as the determination factor, (1) an amount of reduction in pressing force when a predetermined amount of time elapses, (2) an amount of time that elapses before the amount of reduction reaches a predetermined level, (3) a pressing force value when a predetermined amount of time elapses, or (4) an amount of time that elapses before the pressing force value reaches a predetermined value.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2005-021871 filed on Jan. 28, 2005 including specification, claims, drawings and summary is incorporated herein by reference in its entirety.

What is claimed is:

1. A motor-driven brake system comprising:
a brake body for enabling brake pads to be pressed against a disk rotor attached to a member which supports a wheel of a vehicle, to thereby brake said wheel under a pressing force, said brake pads being adapted to be driven by means of an electric device;
a pressing-force maintaining mechanism for maintaining said pressing force generated by said brake body, to thereby effect a parking brake operation;
a pressing-force detecting means adapted to detect said pressing force generated by said brake body; and
a control device for controlling said electric device and said pressing-force maintaining mechanism,
said control device comprising:
an elapsed time measuring means adapted to measure an elapsed time during said parking brake operation by said pressing-force maintaining mechanism; and
a pressing-force reduction predicting means adapted to predict, based on said elapsed time measured by said elapsed time measuring means and a value of said pressing force as detected by said pressing-force detecting means when said elapsed time is measured, a magnitude of said pressing force generated by said brake body after said elapsed time.

2. The motor-driven brake system according to claim 1, wherein said pressing-force reduction predicting means is adapted to determine a pressing-force reduction factor from said elapsed time measured by said elapsed time measuring means and said pressing force as detected by said pressing-force detecting means when said elapsed time is measured, and predicts, based on said pressing-force reduction factor, a magnitude of said pressing force generated by said brake body.

3. The motor-driven brake system according to claim 2, wherein said pressing-force reduction factor is a rate of change in an amount of reduction in said pressing force detected by said pressing-force detecting means relative to said elapsed time measured by said elapsed time measuring means.

4. The motor-driven brake system according to claim 3, further comprising a parking brake operation completing means adapted to operate, based on results of prediction by said pressing-force reduction predicting means, so as to continue said prediction by said pressing-force reduction predicting means when said pressing-force reduction factor is greater than a predetermined reference value, and to complete the prediction by said pressing-force reduction predicting means and stop supplying power to said control device when said pressing-force reduction factor is smaller than said predetermined reference value.

5. The motor-driven brake system according to claim 2, wherein said pressing-force reduction factor is a rate of change in said elapsed time measured by said elapsed time measuring means relative to an amount of reduction in said pressing force detected by said pressing-force detecting means.

6. The motor-driven brake system according to claim 5, further comprising a parking brake operation completing means adapted to operate, based on results of prediction by said pressing-force reduction predicting means, so as to continue said prediction by said pressing-force reduction predicting means when said pressing-force reduction factor is smaller than a predetermined reference value, and to complete said prediction by said pressing-force reduction predicting means and stop supplying power to said control device when said pressing-force reduction factor is greater than said predetermined reference value.

7. The motor-driven brake system according to claim 1, wherein said pressing-force reduction predicting means is adapted to predict said magnitude of said pressing force generated by said brake body, based on an amount of reduction in said pressing force as detected by said pressing-force detecting means when a lapse of a predetermined amount of time is measured by said elapsed time measuring means.

8. The motor-driven brake system according to claim 7, further comprising a parking brake operation completing means adapted to operate, based on results of prediction by said pressing-force reduction predicting means, so as to continue said prediction by said pressing-force reduction predicting means when said amount of reduction in said pressing force is greater than a predetermined reference value, and to complete said prediction by said pressing-force reduction predicting means and stop supplying power to said control device when said amount of reduction in said pressing force is smaller than said predetermined reference value.

9. The motor-driven brake system according to claim 1, wherein said pressing-force reduction predicting means is adapted to predict said magnitude of said pressing force generated by said brake body, based on said elapsed time until an amount of reduction in said pressing force detected by said pressing-force detecting means reaches a predetermined value, as measured by said elapsed time measuring means.

10. The motor-driven brake system according to claim 9, further comprising a parking brake operation completing means adapted to operate, based on results of prediction by said pressing-force reduction predicting means, so as to continue said prediction by said pressing-force reduction predicting means when said elapsed time is smaller than a predetermined reference value, and to complete said prediction by said pressing-force reduction predicting means and stop supplying power to said control device when said elapsed time is greater than said predetermined reference value.

11. The motor-driven brake system according to claim 1, wherein said pressing-force reduction predicting means is adapted to predict said magnitude of said pressing force generated by said brake body, based on said value of said pressing force as detected by said pressing-force detecting means when a lapse of a predetermined amount of time is measured by said elapsed time measuring means.

12. The motor-driven brake system according to claim 11, further comprising a parking brake operation completing means adapted to operate, based on results of prediction by said pressing-force reduction predicting means, so as to continue said prediction by the pressing-force reduction predicting means when said value of said pressing force is smaller than a predetermined reference value, and to complete said prediction by said pressing-force reduction predicting means and stop supplying power to said control device when said value of said pressing force is greater than said predetermined reference value.

13. The motor-driven brake system according to claim 1, wherein said pressing-force reduction predicting means is adapted to predict said magnitude of said pressing force generated by said brake body, based on said elapsed time until said value of said pressing force detected by said pressing-force detecting means reaches a predetermined value, as measured by said elapsed time measuring means.

14. The motor-driven brake system according to claim 13, further comprising a parking brake operation completing means adapted to operate, based on results of prediction by said pressing-force reduction predicting means, so as to continue said prediction by said pressing-force reduction predicting means when said elapsed time is smaller than a predetermined reference value, and to complete said prediction by said pressing-force reduction predicting means and stop supplying power to said control device when said elapsed time is greater than said predetermined reference value.

15. The motor-driven brake system according to claim 1, wherein said control device includes a parking brake re-operation controlling means, said parking brake re-operation controlling means being adapted to increase said pressing force to a level greater than a required pressing force by means of said electric device when a value equal to or less than said required pressing force is detected by said pressing-force detecting means during prediction by said pressing-force reduction predicting means.

16. The motor-driven brake system according to claim 1, wherein:
   said electric device is a motor;
   said brake body comprises a caliper having provided therein a piston, said motor and a rotary-linear motion conversion mechanism, said rotary-linear motion conversion mechanism being adapted to enable rotation of a rotor of said motor to be converted to a linear motion and transmitted to said piston, said piston being adapted to thrust so as to press said brake pads against said disk rotor according to rotation of said rotor of said motor;
   said pressing-force maintaining mechanism is provided so as to rotate with said rotor of said motor,
   said pressing-force maintaining mechanism comprising: a ratchet wheel having a plurality of substantially projecting tooth portions arranged continuously in a circumferential direction on an outer circumferential surface of the ratchet wheel; an engaging claw provided at a periphery of said ratchet wheel and adapted to move so as to be capable of being engaged with, or disengaged from, the ratchet wheel; and an actuator for moving said engaging claw; and
   said parking brake operation is conducted by engaging the engaging claw with said ratchet wheel.

* * * * *